US012300233B2

(12) United States Patent
Villette et al.

(10) Patent No.: US 12,300,233 B2
(45) Date of Patent: May 13, 2025

(54) MEDIA SEGMENT REPRESENTATION USING FIXED WEIGHTS

(71) Applicant: QUALCOMM Incorporated, San Diego, CA (US)

(72) Inventors: Stephane Villette, San Diego, CA (US); Sen Li, San Diego, CA (US); Daniel Jared Sinder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 310 days.

(21) Appl. No.: 18/047,562

(22) Filed: Oct. 18, 2022

(65) Prior Publication Data
US 2024/0127809 A1   Apr. 18, 2024

(51) Int. Cl.
*G10L 15/00* (2013.01)
*G10L 15/04* (2013.01)
*G10L 15/16* (2006.01)
*G10L 15/22* (2006.01)
*G10L 25/78* (2013.01)

(52) U.S. Cl.
CPC .............. *G10L 15/22* (2013.01); *G10L 15/04* (2013.01); *G10L 15/16* (2013.01); *G10L 25/78* (2013.01)

(58) Field of Classification Search
None
See application file for complete search history.

(56) References Cited

U.S. PATENT DOCUMENTS 9,666,204 B2   5/2017   Manjunath et al.

FOREIGN PATENT DOCUMENTS

| CN | 114627898 A | 6/2022 | |
| EP | 3416166 B1 | 8/2020 | |
| WO | 2015168444 A1 | 11/2015 | |
| WO | WO-2024086445 A1 * | 4/2024 | ............ G10L 15/04 |

OTHER PUBLICATIONS

Wen Zhengoi et al: "Deep neural network based voice conversion with a large synthesized parallel corpus", 2016 Asia-Pacific Signal and Information Processing Association Annual Summit and Conference (APSIPA), Asia Pacific Signal and Information Processing Association, p. 1-5 (Year: 2016).*

(Continued)

*Primary Examiner* — Satwant K Singh
(74) *Attorney, Agent, or Firm* — QUALCOMM Incorporated; Espartaco Diaz Hidalgo

(57) ABSTRACT

A device includes a memory configured to store a collection of sets of weights, each of the sets of weights representing a respective media segment. The device also includes one or more processors configured to generate data representing the detected first input speech segment and to pass the data representing the detected first input speech segment into a collection of memory units. Each memory unit of the collection of memory units includes a set of weights from the collection of sets of weights. The one or more processors are also configured to generate a first estimate of an associated media segment that represents the detected first input speech segment. The associated media segment corresponds to a first memory unit in the collection of memory units.

28 Claims, 24 Drawing Sheets

(56) References Cited

OTHER PUBLICATIONS

Hunt A J., et al., "Unit Selection in a Concatenative Speech Synthesis System Using a Large Speech Database", 1996 IEEE International Conference on Acoustics, Speech, and Signal Processing—Proceedings. (ICASSP). Atlanta, May 7-10, 1996, New York, IEEE, US, vol. 1, May 7, 1996, XP002133444, pp. 373-376, ISBN: 978-0-7803-3193-8, Abstract, Sections 1, 2.1, 3.1.
International Search Report and Written Opinion—PCT/US2023/075951—ISA/EPO—Jan. 26, 2024.
Turk O., "New Methods for Voice Conversion", These De Doctorat Presentee Au Departement De Chimie De L'universite De Lausanne Pour L'obtention Du Grade De Docteur Es Sciences, Sep. 1, 2003, XP008072772, 138 pages, Section 6.1.
Wen Z., et al., "Deep Neural Network Based Voice Conversion with a Large Synthesized Parallel Corpus", 2016 Asia-Pacific Signal and Information Processing Association Annual Summit and Conference (APSIPA), Asia Pacific Signal and Information Processing Association, Dec. 13, 2016, XP033044734, 5 pages, Abstract, Sections II and III.

\* cited by examiner

MEDIA SEGMENT REPRESENTATION USING FIXED WEIGHTS

I. FIELD

The present disclosure is generally related to media segmentation and using representations of media segments to facilitate media generation.

II. DESCRIPTION OF RELATED ART

Advances in technology have resulted in smaller and more powerful computing devices as well as an increase in the availability of and consumption of media. For example, there currently exist a variety of portable personal computing devices, including wireless telephones such as mobile and smart phones, tablets and laptop computers that are small, lightweight, and easily carried by users and that enable generation of media content and consumption of media content nearly anywhere.

Although the above-described technological advances have included efforts to improve communication of media content, such communication remains challenging. For example, it can be challenging to generate speech that sounds like natural human speech. One approach to generate natural-sounding speech is to store a database of recorded speech segments, such as diphones. Synthesized speech can be generated by performing database lookups to retrieve a sequence of the speech segments from the database, which can be joined to form synthesized speech. However, it can be difficult to determine which recorded speech segments are to be retrieved, and the high rate of input/output operations needed to retrieve recorded speech segments for real-time speech synthesis can be prohibitive for portable personal computing devices.

III. SUMMARY

According to a particular aspect, a device includes a memory configured to store a collection of sets of weights, each of the sets of weights representing a respective media segment. The device also includes one or more processors configured to detect a first input speech segment and to generate data representing the detected first input speech segment. The one or more processors are also configured to pass the data representing the detected first input speech segment into a collection of memory units. Each memory unit of the collection of memory units includes a set of weights from the collection of sets of weights. The one or more processors are further configured to generate a first estimate of an associated media segment that represents the detected first input speech segment. The associated media segment corresponds to a first memory unit in the collection of memory units.

According to a particular aspect, a method includes detecting, at a device, a first input speech segment. The method also includes passing data representing the detected first input speech segment into a collection of memory units, where each memory unit includes a set of weights representing a respective media segment. The method further includes outputting a first estimate of an associated media segment that represents the detected first input speech segment. The associated media segment corresponds to a first memory unit in the collection of memory units.

According to a particular aspect, a non-transitory computer-readable medium stores instructions that, when executed by one or more processors, cause the one or more processors to detect a first input speech segment. The instructions, when executed by the one or more processors, also cause the one or more processors to pass data representing the detected first input speech segment into a collection of memory units, where each memory unit includes a set of weights representing a respective media segment. The instructions, when executed by the one or more processors, further cause the one or more processors to output a first estimate of an associated media segment that represents the detected first input speech segment. The associated media segment corresponds to a first memory unit in the collection of memory units.

According to a particular aspect, an apparatus includes means for detecting a first input speech segment. The apparatus also includes means for passing data representing the detected first input speech segment into a collection of memory units, where each memory unit includes a set of weights representing a respective media segment. The apparatus further includes means for outputting a first estimate of an associated media segment that represents the detected first input speech segment, the associated media segment corresponding to a first memory unit in the collection of memory units.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
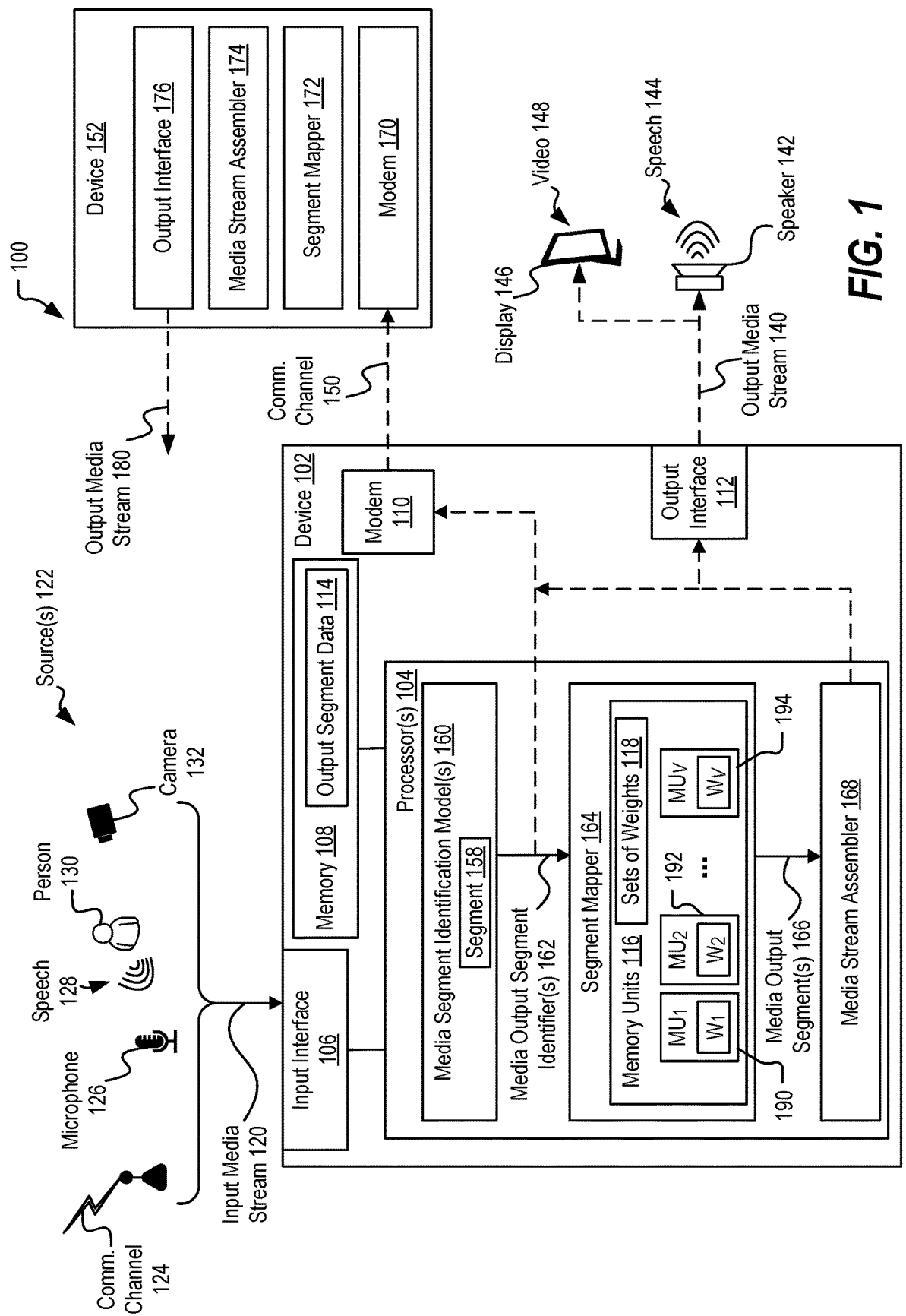
FIG. 1 is a block diagram of a particular illustrative aspect of a system operable to represent media segments using sets of weights, in accordance with some examples of the present disclosure.

People are particularly adept at recognizing the facial expressions and speech sounds of other people. Near-realistic depictions of humans in media (such as in some computer-generated graphics) that are only slightly unnatural can lead to the so called "uncanny valley" effect, which can cause people consuming such media to experience emotional unease or even revulsion. Even minor differences between human-like representations (e.g., faces or voices) in media and natural (i.e., real) human depictions can produce such unease. Further, computer-generated voices can be harder to understand due to unnatural rhythms and emphasis, and a lack of natural variations in sounds that are present in human speech. However, generating natural-sounding speech can be challenging. For example, speech synthesis based on combining segments of pre-recorded human speech from a database can necessitate a large number of input/output operations as each segment is retrieved from the database via a lookup operation. Such a large number of database access operations can incur significant costs with regard to power consumption and memory bandwidth that can render such solutions unsuitable for real-time speech synthesis, such as in portable personal computing devices that may be relatively resource constrained.

Systems and methods of representing media segments using sets of weights to facilitate media generation are disclosed. For example, according to a particular aspect, at least audio content of a media stream is segmented and processed to determine a media output segment identifier. The media output segment identifier includes data sufficient to select a particular media segment for output. In a particular aspect, the media segment corresponds to a segment of pre-recorded natural human speech. In some implementations, the media segment includes sound representing one or more utterances. In some implementations, the media segment also, or alternatively, includes one or more images depicting human facial movements associated with generation of the one or more utterances.

The media output segment identifier is input to a segment mapper that includes a collection of memory units, with each memory unit including a set of weights representing a respective media segment. According to an aspect, the collection of memory units corresponds to nodes of a network (e.g., a fully connected neural network layer), with each set of weights linking a respective node of an input layer to nodes of an output layer. To illustrate, the media output segment identifier can be implemented as a one-hot vector or array of elements so that a single node of the input layer receives a 1 value and the remaining nodes of the input layer receive a 0 value, resulting in the output layer generating output values that match the weights associated with the 1-valued input node. For example, each set of weights can represent audio parameters such as pulse code modulated (PCM) sample values, duration, voice activity detection, pitch, etc., or a combination thereof. Alternatively, or in addition, each set of weights can represent video parameters such as pixel values of a video frame, head pose, facial landmarks, etc.

Because the output values that are generated at the output layer match the set of weights that connects the activated node of the input layer (e.g., the node that receives the 1 value) to the output layer, the collection of memory units can provide the functionality of a lookup table or database in which the sets of weights correspond to stored data elements that are retrieved via activation of associated nodes of the input layer. A collection of memory units having such a configuration is also referred to herein as a "fixed database layer."

By using a network structure—e.g., by arranging the media segment data as sets of weights representing interconnections between an input layer and an output layer—to enable retrieval of data for particular media output segments, efficiencies associated with neural network processing can be leveraged for the retrieval of data associated with the media segments. For example, components such as neural processing units (NPUs) that are specialized for neural network processing can provide high-bandwidth data transfer and local storage of weights as well as dedicated circuitry to enable efficient parallel processing of very large data sets associated with machine learning models. Thus, using a fixed database layer can enable more efficient retrieval of data associated with media segments as compared to performing conventional database or table lookup operations.

The retrieved media segments can be combined to form an output media stream, such as to provide natural-sounding human speech based on pre-recorded speech data that is stored in the fixed database layer. In various implementations, the output media stream can be generated based on a received input media stream to provide noise reduction, voice conversion, speech anonymization, packet loss concealment, video generation, or any combination thereof, as illustrative, non-limiting examples.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 104 of FIG. 1), which indicates that in some implementations the device 102 includes a single processor 104 and in other implementations the device 102 includes multiple processors 104. For ease of reference herein, such features are generally introduced as "one or more" features and are subsequently referred to in the singular or optional plural (as indicated by "(s)" in the name of the feature) unless aspects related to multiple of the features are being described.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system 100 configured to generate one or more media output segment identifiers 162 based on an input media stream 120 is shown. Additionally, in the example illustrated in FIG. 1, the system 100 is configured to generate an output media stream 140 and/or an output media stream 180 based on the media output segment identifier(s) 162 and based on a collection of memory units 116 that each include a set of weights of a collection of sets of weights 118.

The system 100 includes a device 102 that is coupled to or includes one or more sources 122 of media content of the input media stream 120. For example, the source(s) 122 may include a microphone 126, a camera 132, a communication channel 124, or a combination thereof. In the example illustrated in FIG. 1, the source(s) 122 are external to the device 102 and coupled to the device 102 via an input interface 106; however, in other examples, one or more of the source(s) 122 is a component of the device 102. To illustrate, the source(s) 122 may include a media engine (e.g., a game engine or an extended reality engine) of the device 102 that generates the input media stream 120 based on instructions executed by one or more processors 104 of the device 102.

The input media stream 120 includes at least data representing speech 128 of a person 130. For example, when the sources 122 include the microphone 126, the microphone 126 may generate signals based on sound of the speech 128. When the source(s) 122 include the camera 132, the input media stream 120 may also include one or more images (e.g., video frames) depicting the person 130. When the source(s) 122 include the communication channel 124, the input media stream 120 may include transmitted data that represents the speech 128, such as a plurality of data packets encoding the speech 128. The communication channel 124 may include or correspond to a wired connection between two or more devices, a wireless connection between the two or more devices, or both.

In the example of FIG. 1, the device 102 is configured to process the input media stream 120 to determine the media output segment identifier(s) 162. Each media output segment identifier 162 indicates one or more media segments that are to be included in the output media stream 140 to represent one or more corresponding segments of the input media stream 120. As an example, the input media stream 120 may be parsed into segments that each correspond to one or more phonemes or other utterance segments of the speech. In this example, each media output segment identifier 162 corresponds to a media segment that includes one or more phonemes or other utterance segments of the speech similar to the one or more phonemes or other utterance segments of the speech 128 of the input media stream 120, as explained further below.

In FIG. 1, the device 102 includes an input interface 106, an output interface 112, the processor(s) 104, memory 108, and a modem 110. The input interface 106 is coupled to the processor(s) 104 and configured to be coupled to one or more of the source(s) 122. For example, the input interface 106 is configured to receive a microphone output from the microphone 126 and to provide the microphone output to the processor(s) 104 as the input media stream 120.

The output interface 112 is coupled to the processor(s) 104 and configured to be coupled to one or more output devices, such as one or more speakers 142, one or more display devices 146, etc. The output interface 112 is configured to receive data representing the output media stream 140 from the processor(s) 104 and to send the output media stream 140 corresponding to the data to the output device(s).

The processor(s) 104 are configured to receive the input media stream 120 and determine the media output segment identifiers 162 based on the input media stream 120. In the example illustrated in FIG. 1, the processor(s) 104 include one or more media segment identification models 160, a segment mapper 164, and a media stream assembler 168. The media segment identification model(s) 160 are configured to process the input media stream 120 and determine the media output segment identifier(s) 162, the segment mapper 164 includes a fixed database layer (FDL) configured to determine one or more media output segments 166 based on the media output segment identifier(s) 162, and the media stream assembler 168 is configured to generate an output media stream based on the media output segment(s) 166, as described in further detail below. Each of the media segment identification model(s) 160, the segment mapper 164, and the media stream assembler 168 may include or correspond to instructions that are executable by the processor(s) 104 to perform the various operations described herein.

In some implementations, the media segment identification model(s) 160 include one or more trained models. Examples of trained models include machine-learning models, such as neural networks, adaptive neuro-fuzzy inference systems, support vector machines, decision trees, regression models, Bayesian models, or Boltzmann machines, or ensembles, variants, or other combinations thereof. Variants of decision trees include, for example and without limitation, random forests, boosted decision trees, etc. Variants of neural networks include, for example and without limitation, transformers, self-attention networks, convolutional neural networks, deep neural networks, deep belief networks, etc.

In a particular implementation, the media segment identification model(s) 160 are trained to parse the input media stream 120 into segments, such as a representative input media segment 158. Each segment represents a portion of the input media stream 120 that can be mapped to a media output segment 166. As a non-limiting example, each segment may include silence, background noise, one or more phonemes or other utterances of the speech 128, etc. In some implementations, parsing of the input media stream 120 is based on content of (e.g., sounds within) the speech 128. In such implementations, different segments can represent different durations of the input media stream 120. To illustrate, a first segment may correspond to 50 milliseconds of the input media stream 120, and a second segment may correspond to 160 milliseconds of the input media stream 120. In one experiment, a sample input media stream 120 with an overall duration of about 2.5 hours of English-language speech was processed to generate about 96,000 segments, and an average segment represented about 100 milliseconds of the input media stream 120. The specific duration represented by the segments may vary from one implementation to another based on, for example, the content of the speech 128, the language(s) of the speech 128, and how the media segment identification model(s) 160 are trained. Further, although variable duration segments are described herein, in some implementations, fixed duration segments may be used.

In a particular implementation, after the media segment identification model(s) 160 determine a segment, the segment (and optionally one or more nearby segments) may be input to a feature extractor of the media segment identification model(s) 160. The feature extractor is configured to generate a feature map (e.g., a feature vector or feature array) that represents aspects of the segment. In some implementations, the feature extractor is a temporally dynamic feature extractor. For example, the feature map associated with a particular segment may be affected by the content of one or more segments that precede the particular segment in the input media stream 120, may be affected by the content of one or more segments that follow the particular segment in the input media stream 120, or both. Examples of trained models that can be used to perform temporally dynamic feature extraction include, without limitation, recurrent neural networks (RNNs) (e.g., neural networks with one or more recurrent layers, one or more long short-term memory (LSTM) layers, one or more Gated Recurrent Unit (GRU) layers), recurrent convolutional neural networks (RCNNs), self-attention networks (e.g., transformers), other machine-learning models that are adapted to process time-series data in a temporally dynamic manner, or variants, ensembles, or combinations thereof.

According to a particular aspect, the input media stream 120 includes a sequence of data frames of content from the source(s) 122, and the media segment identification model(s) 160 generate a sequence of the media output segment identifiers 162 based on the input media stream 120. Each media output segment identifier 162 is generated based on one or more data frames of the input media stream 120. Further, the number of data frames of the input media stream 120 used to generate a single media output segment identifier 162 may vary from one media output segment identifier 162 to the next. As one, non-limiting example, each data frame may represent 25 milliseconds of audio content, and each media output segment identifier 162 may represent between 25 milliseconds of audio content and several hundred milliseconds of audio content. Thus, the feature extractor may be viewed as a sequence-to-sequence feature extractor that is configured to generate a sequence of feature maps (e.g., feature vectors or feature arrays) based on a sequence of content of the input media stream 120. Viewed in this way, the sequence-to-sequence feature extractor takes in data at a first rate (e.g., one data frame every 25 milliseconds) and outputs data at a second rate (e.g., one media output segment identifier 162 for every 25 millisecond to K×25 milliseconds, where K is an integer greater than or equal to one) where the first and second rates are, on average, unequal.

As one example, the feature extractor may generate one media output segment identifier 162 for each phoneme, each set of phonemes, or some other utterance unit of the speech 128. As used herein, the term "phoneme" is used broadly to refer to a unit of sound that can distinguish one word from another in a particular language. Although various sources have put forth or agreed upon particular lists of "phonemes" that are useful for academic purposes, no such list is specifically referenced by the term phoneme as used herein. Indeed, since a trained model (e.g., the media segment identification model(s) 160) segments the speech 128, the specific phonemes or other utterance units used to distinguish segments can be based on the training of the model. As an example, in the experiment referred to above in which approximately 2.5 hours of speech was segmented into approximately 96,000 segments, the trained model that performed the segmentation was trained to group biphones into a segment, where a biphone refers to a sequential pair of phonemes.

In addition to the feature extractor, the media segment identification model(s) 160 may include one or more trained models configured to determine the media output segment identifiers 162 based on the feature map output by the feature extractor. In some implementations, a media output segment identifier 162 includes multiple elements of a vector, an array, or another data structure, and the multiple elements include one element for each media output segment 166 that can be indicated by the media output segment identifier 162. For example, if the segment mapper 164 is able to access or generate 2000 distinct media output segments 166, then in this implementation, the media output segment identifier 162 may include a vector with 2000 elements, each of the 2000 elements corresponding to a respective one of the 2000 media output segments 166.

In some such implementations, each media output segment identifier 162 is a one-hot vector or one-hot array (or an encoded version of a one-hot vector or one-hot array). To illustrate, continuing the example above, if the segment mapper 164 is able to generate 2000 distinct media output segments 166 and the media output segment identifier 162 is a one-hot vector, 1999 elements of the media output segment identifier 162 will have a first value (e.g., a 0 value) indicating that the media output segments 166 corresponding to these elements are not indicated by the media output segment identifier 162, and 1 element of the media output segment identifier 162 will have a second value (e.g., a 1 value) indicating that the media output segment 166 corresponding to this element is indicated by the media output segment identifier 162.

In some implementations, the media output segment identifier 162 is not a one-hot vector. For example, in some such implementations, the media output segment identifier 162 is a vector or array that includes multiple elements with non-zero values. To illustrate, the media output segment identifier 162 may include, for each element of the array or vector, a likelihood value that indicates a likelihood that the corresponding media output segment 166 corresponds to a segment of the input media stream 120 represented by a feature map from the feature extractor. In some implementations, the media output segment identifier 162 does not include a likelihood value for every element. For example, one or more thresholds may be used to filter the likelihood values such that only particularly relevant likelihood values are included in the media output segment identifier 162 and other likelihood values are zeroed out. To illustrate, the media output segment identifier 162 may include a top two, three, five, or some other number, of highest likelihood values, and the remaining elements of the media output segment identifier 162 may include zero values. As another illustrative example, the media output segment identifier 162 may include each likelihood value that exceeds a threshold (e.g., a likelihood of 0.1, 0.2, 0.5, or some other value), and the remaining elements of the media output segment identifier 162 may include zero values.

In several examples above, the segment mapper 164 was described as being able to generate 2000 distinct media output segments 166. These examples are provided merely for illustrative purposes and are not limiting. The specific number of distinct media output segments 166 that the segment mapper 164 is able to generate may vary from one implementation to another depending on training data used to train the media segment identification model(s) 160, the segment mapper 164, or other factors. As one illustrative example, in the experiment referenced above in which approximately 2.5 hours of audio was processed, each identified segment (e.g., each identified biphone) of the entire 2.5 hours of audio was stored as a distinct media output segment 166. Thus, the segment mapper 164 of this experiment was able to access or generate approximately 96,000 media output segments 166, and the media output segment identifier 162 was a vector including approximately 96,000 values. It is expected that many of the media output segments 166 of this set of media output segments were very similar due to the English language having many common sounds. As such, the set of media output segments (and correspondingly, the dimensionality of the media output segment identifier 162) could be reduced by performing additional processing to identify duplicate or near-duplicate media output segments 166.

In some implementations, the segment mapper 164 is able to generate or access a set of media output segments 166 that includes every common phoneme in a particular language, every common sequential set of phonemes in the particular language, every phoneme actually used in a particular language, or every sequential set of phonemes actually used in the particular language. In some implementations, the set of media output segments 166 includes at least a representative set of common phonemes or sequential sets of phonemes in a particular language. For example, the set of media output segments 166 may be obtained from a recording of media content that is considered to be of sufficient duration and variety to correspond to a representative set. To illustrate, in the experiment referred to above, a 2.5 hour recording of English-language speech was considered to be sufficient to provide a viable representative set of media output segments 166.

While retaining media output segments that are very similar to one another (rather than deduplicating the set of media output segments) may reduce the dimensionality of the media output segment identifiers 162, retaining at least some media output segments that are similar to one another can facilitate generation of more natural sounding speech in the output media stream 140. Thus, for implementations in which reduction of computing resources used to produce the output media stream 140 (such as memory required to store output segment data 114 representing the media output segments, processing time and power to compute the media output segment identifier 162, etc.) is prioritized over optimizing the natural-sounding quality of the output speech, the set of media output segments may be processed to reduce the number of duplicate or nearly duplicate media output segments. Conversely, for implementations in which generation of natural sounding speech in the output media stream 140 is more highly prioritized, a set of media output segments that includes some nearly duplicate media output segments may be used to enable production of speech with more natural sounding variation.

In some implementations, when the media output segment identifier 162 is high-dimensional (e.g., has thousands, tens of thousands, or hundreds of thousands of elements), training the media segment identification model(s) 160 can be challenging. For example, in the experiment referred to above, the media output segment identifier 162 had about 96,000 elements. The trained model(s) used to generate the media output segment identifier 162 can be thought of as classifiers that indicate a class that corresponds to one or more of the media output segments 166. To illustrate, when the media output segment identifier 162 is a one-hot vector, the single non-zero value of the media output segment identifier 162 represents a class that corresponds to a media output segment 166. Training a classifier to reliably select a single element from about 96,000 classes where some of the classes may be similar or nearly identical is a challenging training situation.

This training challenge can be reduced by using a multi-stage model to divide the inference process into hierarchical stages. For example, the 96,000 classes can be grouped into supersets (referred to herein as "utterance classes"). In this example, a first stage of the trained model determines an utterance class associated with a particular feature map representing a segment of the input media stream 120. The utterance class and the feature map are provided as input to a second stage of the trained model to generate the media output segment identifier 162. In this hierarchical approach, providing the utterance class to the second stage along with the feature map skews (e.g., weights) the analysis performed by the second stage to favor results that assign the media output segment identifiers 162 to indicate a media output segment 166 that is in the indicated utterance class.

In FIG. 1, one or more of the media output segment identifier(s) 162 is provided to the segment mapper 164. Additionally, or alternatively, one or more of the media output segment identifier(s) 162 is provided to the modem 110 for transmission to one or more other devices (e.g., a device 152). For example, in circumstances where the output media stream 140 is to be generated by the device 102, the media output segment identifier(s) 162 are provided to the segment mapper 164, and processing at the segment mapper 164 and the media stream assembler 168 results in generation of data representing the output media stream 140. To illustrate, when the input media stream 120 is received from the communication channel 124, the device 102 may provide the output media stream 140 to the speaker 142, the display device 146, or both. Another example of when the media output segment identifier(s) 162 are provided to the segment mapper 164 is when the device 102 receives the speech 128 from the microphone 126, and the device 102 is to perform noise reduction or voice modification operations, such as changing an accent. In this example, data representing the output media stream 140 may be generated by the media stream assembler 168 and provided to the modem 110 for transmission via a communication channel 150 to the device 152.

In some implementations where the device 152 is to produce an output media stream 180 based on the input media stream 120, the media output segment identifier(s) 162 are provided to the modem 110 for transmission to the device 152 via a communication channel 150. In other implementations where the device 152 is to produce an output media stream 180 based on the input media stream 120, the segment mapper 164 generates media output segment identification data, such as memory unit indexes identifying of which of a collection of memory units 116 is associated with each sequential segment of the output media stream 180. Such media output segment identification data may correspond to a one-hot version of the media output segment identifier 162 and is provided to the modem 110 for transmission to the device 152 via the communication channel 150. The communication channel 150 may include or correspond to a wired connection between two or more devices, a wireless connection between the two or more devices, or both.

When the media output segment identifier(s) 162 are provided to the segment mapper 164, the segment mapper 164 generates a media output segment 166 corresponding to each media output segment identifier 162 and provides the media output segments 166 to the media stream assembler 168. In a particular example, the segment mapper 164 includes the collection of memory units 116, illustrated as including a first memory unit ($MU_1$) 190, a second memory unit ($MU_2$) 192, and one or more additional memory units including a Vth memory unit ($MU_V$) 194, where V is an integer greater than one. Each memory unit of the collection of memory units 116 includes a set of weights (e.g., $W_1$, $W_2$, . . . $W_V$) from a collection of sets of weights 118, and each of the sets of weights represents a respective media segment. In some implementations, the collection of sets of weights 118 may be included in output segment data 114 that is retrieved from the memory 108 by the segment mapper 164. The segment mapper 164 is configured to generate an estimate of an associated media segment, illustrated as a media output segment 166, corresponding to a particular memory unit in the collection of memory units 116 that is identified by a media output segment identifier 162.

According to a particular implementation, the processor(s) 104 are configured to detect an input speech segment (e.g., the input media segment 158) of the input media stream 120 and to generate data representing the detected input speech segment, via operation of the media segment identification model(s) 160 to generate a particular media output segment identifier 162. The processor(s) 104 pass the particular media output segment identifier 162 representing the detected input speech segment into the collection of memory units 116 of the segment mapper 164, and the segment mapper 164 generates a particular media output segment 166 as an estimate of an associated media segment that represents the detected input speech segment. The particular media output segment 166 may be part of a reconstructed representation of the detected input speech segment included in the output media stream 140. In some implementations, the processor(s) 104 generate multiple estimates of the input speech segment, such as multiple media output segments 166 for the input speech segment, and one of the multiple estimates is selected for inclusion in the output media stream 140 by the segment mapper 164 or by the media stream assembler 168.

The media output segment 166 that is output by the segment mapper 164 includes a set of elements corresponding to media parameters. For example, the output of the segment mapper 164 may include a set of elements representing PCM sample values, and each media output segment identifier 162 may be a one-hot vector or a one-hot array. In some such implementations, a layer of the media segment identification model(s) 160 that generates the media output segment identifiers 162 can be viewed as an embedding layer that is connected to an output layer represented by the segment mapper 164. Link weights (e.g., a set of weights 118) between a node of the embedding layer and nodes of the output layer are predetermined (e.g., before the media segment identification model(s) 160 are trained) and configured to cause the output layer to generate the media parameters representing the media output segment 166 corresponding to the media output segment identifier 162. Example implementations of the segment mapper 164 are described in further detail below.

The media stream assembler 168 assembles the media output segments 166 from the segment mapper 164 to generate data representing the output media stream 140. To illustrate, the media stream assembler 168 concatenates or otherwise arranges the media output segments 166 to form an ordered sequence of media output segments 166 for playout. In some examples, the data representing the output media stream 140 is provided to the output interface 112 for playout at the speaker 142 as speech 144, to the display device 146 for playout as video 148, or both. In the same or different examples, the data representing the output media stream 140 may be provided to the modem 110 for transmission, via the communication channel 150, to the device 152.

When the media output segment identifiers 162 (rather than the output media stream 140) are provided to the modem 110 for transmission to the device 152, the device 152 can generate the output media stream 180 based on the media output segment identifiers 162. For example, in FIG. 1, the device 152 includes a modem 170, a segment mapper 172, a media stream assembler 174, and an output interface 176. When the device 152 receives a media output segment identifier 162, the modem 170 of the device 152 may provide the media output segment identifier 162 to the segment mapper 172. The segment mapper 172 operates in the same manner as the segment mapper 164 of the device 102. For example, the segment mapper 172 generates a media output segment 166 corresponding to the media output segment identifier 162. The media stream assembler 174 assembles the media output segments 166 from the segment mapper 172 to generate data representative of the output media stream 180, in the same manner as described for the media stream assembler 168, and the resulting output media stream 180 is output by the device 152 via the output interface 176.

In some implementations, the media output segments 166 available to the segment mapper 172 of the device 152 are different than the media output segments 166 available to the segment mapper 164 of the device 102. To illustrate, the memory units 116 of the segment mapper 172 may have a first collection of sets of weights 118 to enable generation of a set of media output segments 166 representing speech of a first talker (e.g., a male), and the memory units of the segment mapper 172 may have a second collection of sets of weights to enable generation of a set of media output segments 166 representing speech of a second talker (e.g., a female). Irrespective of whether the segment mappers 164, 172 have access to the same sets of weights, the sets of weights that are included in the memory units of each segment mapper 164, 172 are mapped such that the same phonemes or other utterance units correspond to the same media output segment identifiers 162. For example, a particular media output segment identifier 162 may correspond to an "ah" sound, and both of the segment mappers 164 and 172 map the particular media output segment identifier 162 to an "ah" sound of their respective available media output segments 166.

In some implementations, the media segment identification model(s) 160 can be used to predict a media output segment identifier 162 of a portion of the input media stream 120 that is unavailable. For example, when data is received via the communication channel 124, occasionally, a packet or other data unit may be lost or corrupted. In such situations, content (e.g., media) of the packet or other data unit is not available in the input media stream 120. Because the media segment identification model(s) 160 are configured to generate a stream of media output segment identifier(s) 162 based on an input media stream 120, the media segment identification model(s) 160 can be used to predict a media output segment identifier 162 corresponding to the missing content. The predicted media output segment identifier 162 can be used to in place of the missing content during playout of the output media stream 140.

While the description above has focused primarily on examples in which the media output segments 166 represent audio data, in some implementations, the media output segments 166 may include or correspond to images or video data. For example, a media output segment 166 may include one or more images depicting a face of a person making a particular sound (e.g., one or more phonemes or other utterances). In this example, each media output segment identifier 162 maps to a corresponding set of one or more images (e.g., to a respective media output segment 166 that includes pixels data, image feature data, or a combination thereof). When the input media stream 120 represents a particular sound, the media segment identification model(s) 160 generate a media output segment identifier 162 that maps to a media output segment 166 representative of a person making the particular sound. The set of one or more images of the media output segment 166 can be assembled with other images corresponding to other media output segments 166 to generate a sequence of image frames of the output media stream 140. The sequence of image frames provides a realistic depiction of a person speaking a series of sounds corresponding to the input media stream 120. Because the sequence of image frames is assembled from actual pre-recorded images of the person making similar sounds (though possibly in a different order as different words may have been spoken), the sequence of image frames of the output media stream 140 avoids the uncanny valley problem of fully computer-generated video.

The system 100 thus facilitates generation of audio, video, or both, of media that includes human speech in a manner that is natural in sound, appearance, or both. By arranging the media segment data as sets of weights 118 representing interconnections between an input layer and an output layer at the segment mapper 164, efficiencies associated with neural network processing can be leveraged for more efficient retrieval of data associated with media segments as compared to performing conventional lookup operations at a database or table. The system 100 also facilitates low-bit rate communication of speech data coupled with output, at a receiving device, of natural sounding speech. The system 100 further enables modification of audio characteristics of an input media stream, such as noise reduction, voice modification, anonymization, etc.

Figure 2:
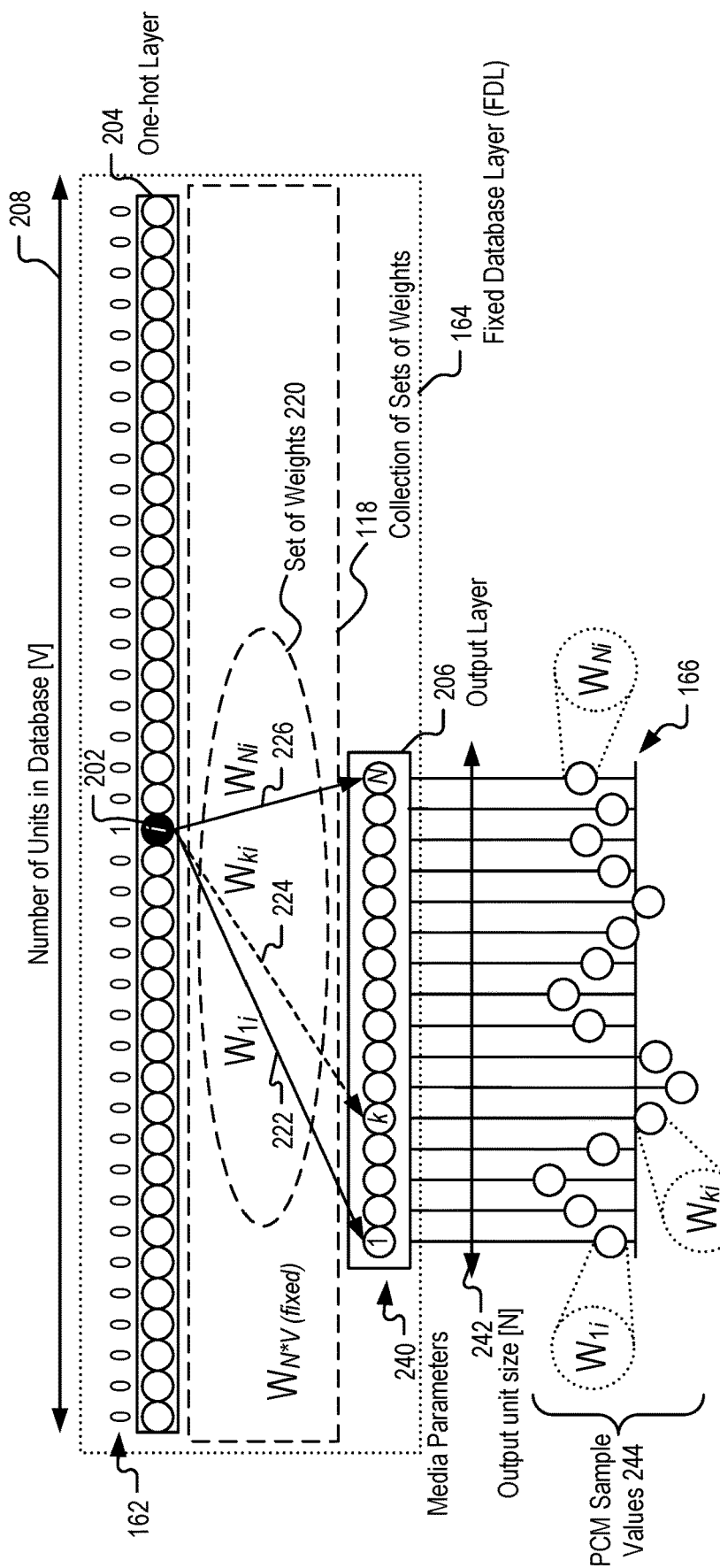
FIG. 2 is a diagram of particular aspects of the system of FIG. 1, in accordance with some examples of the present disclosure.

FIG. 2 is a diagram of particular aspects of the system of FIG. 1, in accordance with some examples of the present disclosure. In particular, FIG. 2 highlights a first example of the segment mapper 164 according to a particular implementation.

In the example illustrated in FIG. 2, the segment mapper 164 (e.g., an FDL) is configured to generate media segment data of a media output segment 166 that corresponds to the media output segment identifier 162. In this example, the segment mapper 164 corresponds to or includes one or more layers of a neural network. For example, the media output segment identifier 162 corresponds to an activated node (node i) 202 of an input layer, referred to as an input layer 204. The input layer 204 has a width (V) 208, where V is a positive integer, that corresponds to the number of memory units 116 in the segment mapper 164. In this example, the input layer 204 is a one-hot encoding layer having V nodes; thus, the media output segment identifier 162 is a one-hot vector or one-hot array having V elements. The input layer 204 may correspond to, or may be coupled to, an output layer (e.g., an embedding layer) of the media segment identification model(s) 160.

The segment mapper 164 also includes an output layer 206 that is coupled to the input layer 204 via one or more links. To illustrate, the output layer 206 may be fully connected to the input layer 204. In this illustrative example, each node of the output layer 206 is connected, via a respective link, to every node of the input layer 204, and each link between the input layer 204 and the output layer 206 is associated with a respective link weight. The output layer 206 has an output unit size N 242 (e.g., a number of nodes in the output layer 206 is N, where N is an integer greater than or equal to 1). Thus, the number of weights in the collection of sets of weights 118 may be given as $W_{N*V}$ and, once trained, the values of the weights may remain fixed (e.g., not further modified). In FIG. 2, one set of link weights (weights 220) is illustrated between one node (node i 202) of the input layer 204 and the nodes of the output layer 206; however, every other node of the input layer 204 is also connected to the output layer 206 via links associated with respective link weights. Although described herein as a fully connected layer, in other implementations the segment mapper 164 includes one or more other types of layers (e.g., one or more convolutional layers) instead of, or in addition to, a fully connected layer.

Each set of link weights in the example of FIG. 2 corresponds to one or more media parameters 240 of a respective media output segment associated with that set of weights. To illustrate, in FIG. 2, a particular set of weights 220 are parameters of the media output segment 166 that is indicated by that media output segment identifier 162. As illustrated, the one or more media parameters 240 include PCM samples 244 that are graphically depicted as time sequence of audio sample values. In other implementations, the one or more media parameters 240 include at least one of: speech parameters including PCM sample values associated with a respective memory unit, compressed representations of the PCM sample values associated with the respective memory unit, or acoustic features associated with the respective memory unit, such as explained further with reference to FIG. 3.

In a particular example, during operation, the segment mapper 164 calculates a value of media segment data for each node of the output layer 206, where the value for a particular node corresponds to one (1) times the weights associated with an activated node of the input layer 204 plus zero (0) times the weights associated with each other node of the input layer 204. Thus, in this example, each value of the media segment data corresponds to a value of the weights 220. To illustrate, the output layer 206 includes nodes having indices from 1 to N. The value of node 1 of the output layer 206 is equal to the value (1) of node i 202 of the input layer 204 times the weight $W_{1i}$ from node i 202 of the input layer 204 to node 1 of the output layer 206, so that the value of PCM sample 1 in the PCM samples 244 is $W_{1i}$. Similarly, the value of node k (where k is an integer between 1 and N) of the output layer 206, and thus the value of PCM sample k in the PCM samples 244, is equal to the weight $W_{ki}$ from node i of the input layer 204 to node k of the output layer 206. Likewise, the value of node N of the output layer 206, and thus the value of PCM sample N of the PCM sample 244, is equal to the weight $W_{Ni}$ from node i 202 of the input layer 204 to node N of the output layer 206.

In this particular example, since the weights $W_{N*V}$ correspond to values for each of the V media segments, each set of weights of the segment mapper 164 can be viewed as a memory unit, and the media output segment identifier 162 can be viewed as a unit index identifying a particular memory unit of the segment mapper 164.

Figure 3:
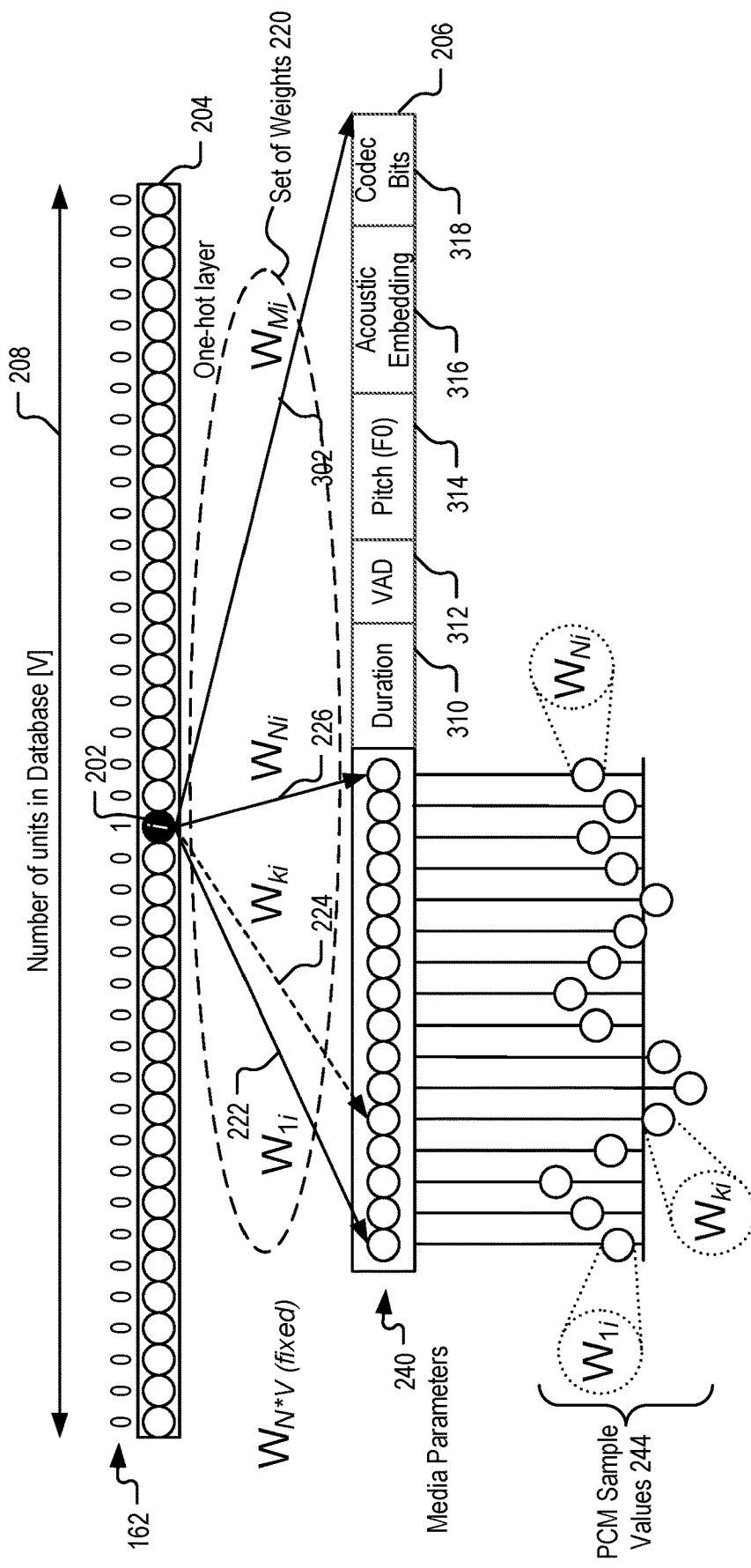
FIG. 3 is a diagram of particular aspects of the system of FIG. 1, in accordance with some examples of the present disclosure.

FIG. 3 is a diagram of particular aspects of the system of FIG. 1, in accordance with some examples of the present disclosure. In particular, FIG. 3 highlights a second example of the segment mapper 164 according to a particular implementation.

In FIG. 3, the output layer 206 includes M nodes, where M is an integer greater than N. Each of the V sets of weights 118 is associated with a respective node of the input layer 204 and includes M weights that link that node of the input layer 204 to the nodes of the output layer 206. To illustrate, the representative set of weights 220 linking node i 202 of the input layer 204 to the output layer 206 includes M weights, including the representative weights $W_{1i}$ 222, $W_{ki}$ 224, $W_{Ni}$ 226, and $W_{Mi}$ 302. $W_{Mi}$ 302 links node i 202 of the input layer 204 to node M of the output layer 206.

Each of the sets of weights 118 represents one or more media parameters 240 of the respective media segment associated with that set of weights, which can include speech parameters including the PCM sample values associated with a respective memory unit, compressed representations of the PCM sample values associated with the respective memory unit, acoustic features associated with the respective memory unit, or a combination thereof. In the example illustrated in FIG. 3, weights $W_{1i}$ 222 to $W_{Ni}$ 226 correspond to the PCM samples 244 as described above, and weights $W_{(N+1)i}$ to $W_{Mi}$ collectively represent media parameters corresponding to duration 310, voice activity detection (VAD) 312, pitch 314 (e.g., fundamental frequency F0), an acoustic embedding 316, and codec bits 318, for the media segment associated with node i of the input layer 204. In a particular implementation, the duration 310 indicates a duration of the media segment, such as for an implementation in which the segments can have variable length (e.g., for phonemes or diphones), the VAD 312 indicates whether the media segment includes voice activity (e.g., a one-bit value indicating whether the segment corresponds a frame of active speech or a frame of silence), and the pitch 314 indicates a fundamental frequency F0 associated with the media segment. The acoustic embedding 316 can correspond to a compressed representation of one or more aspects of the media segment (e.g., a wav2vec vector associated with the segment), and the codec bits 318 can correspond to a compressed version of the PCM samples 244 that have been pre-computed for transmission.

Although the media parameters 240 are illustrated as including the duration 310, VAD 312, pitch 314 (e.g., fundamental frequency F0), acoustic embedding 316, and codec bits 318, in other implementations one or more of the duration 310, VAD 312, pitch 314, acoustic embedding 316, or codec bits 318 may be omitted, one or more additional parameters may be added, or any combination thereof. Although speech-related media parameters are illustrated, the media parameters 240 can include one or more non-speech parameters, such as pixel values of a video frame (e.g., of a person speaking the input sample), visual landmarks of a video frame, head pose vector data, body skeleton data, etc., as illustrative, non-limiting examples.

Figure 4:
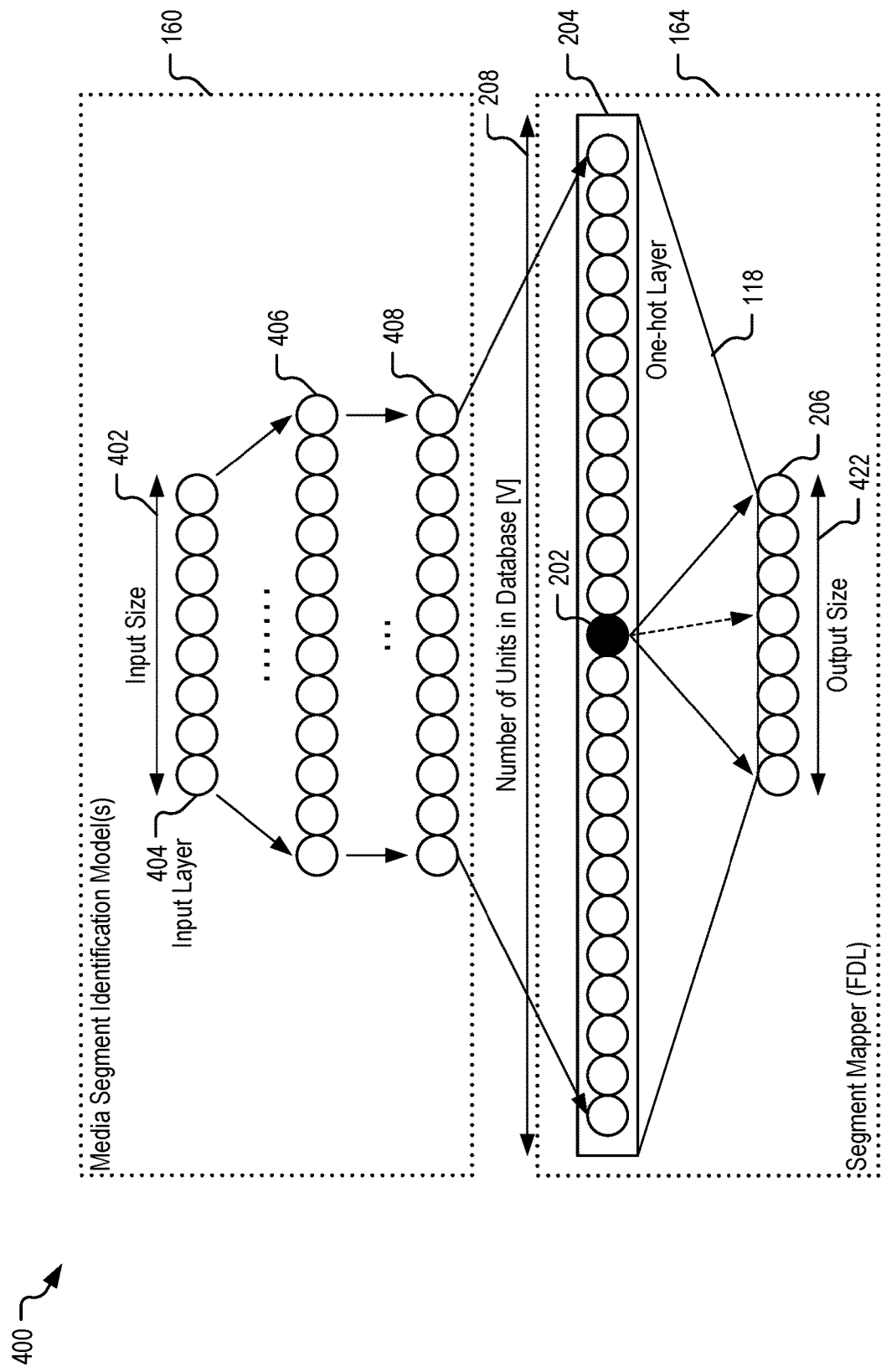
FIG. 4 is a diagram of particular aspects of the system of FIG. 1, in accordance with some examples of the present disclosure.

FIG. 4 is a diagram of a system 400 that includes particular aspects of the system of FIG. 1, in accordance with some examples of the present disclosure. In particular, the system 400 includes a first example of the media segment identification model(s) 160 coupled to the segment mapper 164 according to a particular implementation.

The media segment identification model(s) 160 are illustrated as a network, such as a neural network, that includes an input layer 404, one or more intermediate layers 406, and an output layer 408. The input layer 404 has an input size 402 that corresponds to a size of an input media segment. The output layer 206 of the segment mapper 164 is coupled to the input layer 204 of the segment mapper 164 and has an output size 422 that may match the input size 402 of the media segment identification model(s) 160.

The layers associated with the media segment identification model(s) 160 are configured to process an input media segment (e.g., PCM samples) that is received at the input layer 404 and generate one or more predictions (e.g., likelihood values) of which memory unit 116 in the segment mapper 164 is associated with a media segment that corresponds to the input segment received at the input layer 404. The one or more predictions generated by the media segment identification model(s) 160 may correspond to the media output segment identifier 162 that is provided to the input layer 204 of the segment mapper 164. As described previously, the media segment identification model(s) 160 can include a feature extractor that generates a feature map, a first stage that determines an utterance class based on the feature map, and a second stage that generates the media output segment identifier 162 based on the feature map and the utterance class.

Arranging the media segment identification model(s) 160 and the segment mapper 164 as a single network, as illustrated as FIG. 4, enables closed loop end-to-end training of the media segment identification model(s) 160, such as using backpropagation. Because the weights of the segment mapper 164 are pre-determined (e.g., storing recorded speech samples and associated parameters), the weights 118 of the segment mapper 164 are set as non-trainable (e.g., fixed) so that the recorded data represented by the weights 118 is not altered. In some examples, unsupervised training can be performed that includes comparing an input received at the input layer 404 to an output value at the output layer 206 and adjusting elements (e.g., link weights) of the media segment identification model(s) 160 to reduce or minimize a mean square error (MSE) between the values at the input layer 404 and the output layer 206. Alternatively, or in addition, supervised learning can be performed that uses a loss factor associated with the prediction (e.g., the media output segment identifier 162) generated by the media segment identification model(s) 160 as compared to a target prediction. Various examples including supervised and unsupervised training are described in further detail below.

Because the segment mapper 164 stores data corresponding to recorded media segments as the weights 118, no external table lookup or database search is required during training or inference, which can lead to higher training and inference efficiency and a significant reduction in input/output operations as compared to search-based architectures. In some implementations, memory units of the segment mapper 164 can be grouped (e.g., per utterance class), and information regarding the utterance class can be passed to the segment mapper 164 to determine which group(s) of the weights 118 in the segment mapper 164 are likely to be accessed, which may further lower complexity and may enable more efficient memory bandwidth usage by prioritizing transfer of the determined group(s) of the weights 118.

Another advantage is that, although the segment mapper 164 may be relatively large (e.g., a relatively large width V 208 and number of weights 118), an overall processing rate may be reduced as compared to other architectures that predict one sample at a time and that load network layers at the sample rate (e.g., 16 kHz or higher), which requires a significant amount of memory bandwidth. In contrast to architectures that perform predictions on a per-sample basis, performing per-segment prediction, such as per-frame prediction (e.g., 400 samples at a time) or per-phoneme prediction (e.g., 1600-3200 samples at a time), enables a processing rate to be reduced to the rate of occurrence of the segments (e.g., 100-200 milliseconds per segment) as compared to the sample rate (e.g., 0.0625 milliseconds). Thus, in some implementations, the processing rate can be relaxed by a thousand-fold or more as compared to sample-rate prediction architectures.

Figure 5:
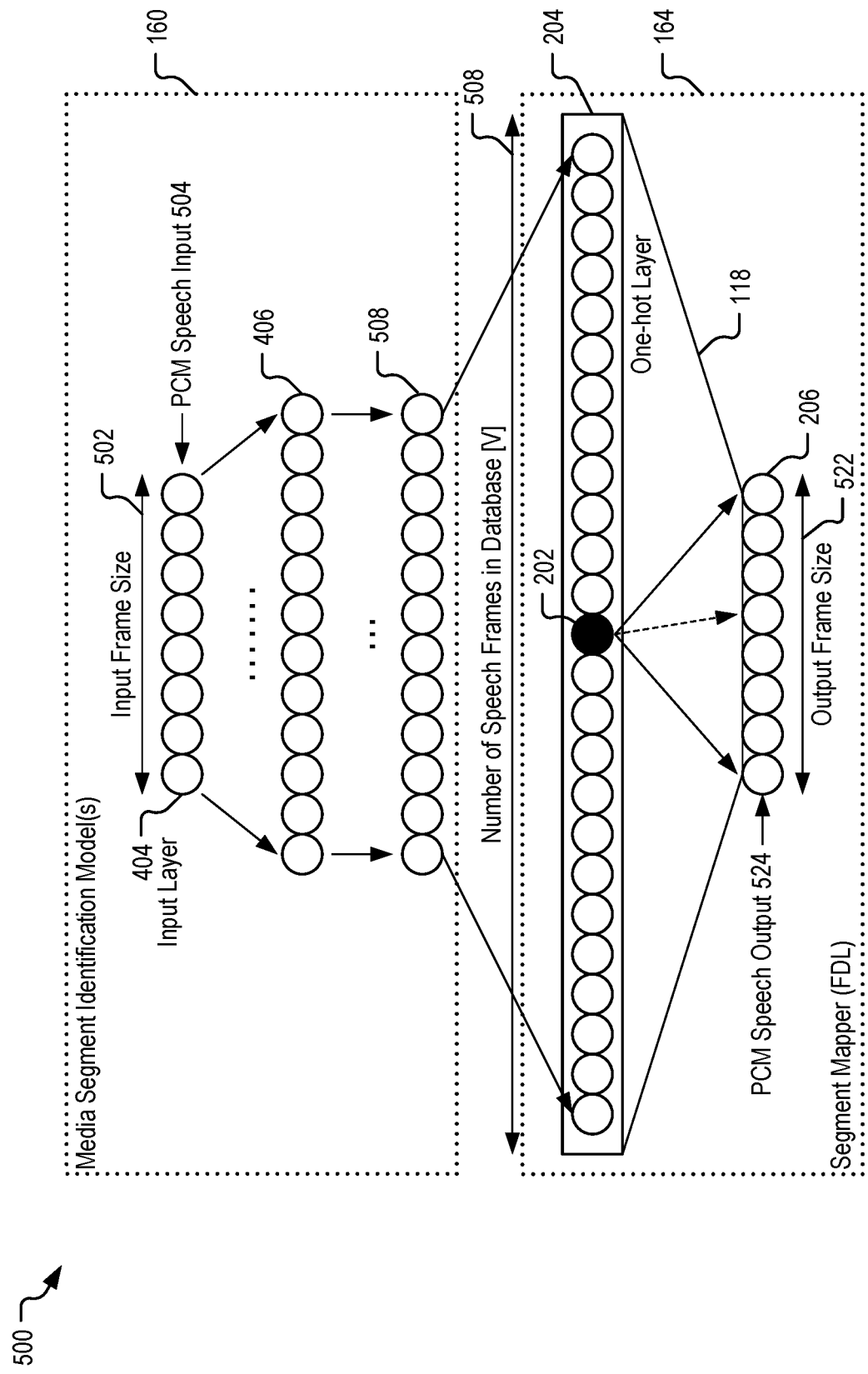
FIG. 5 is a diagram of particular aspects of the system of FIG. 1, in accordance with some examples of the present disclosure.

FIG. 5 is a diagram of a system 500 that includes particular aspects of the system of FIG. 1, in accordance with some examples of the present disclosure. In particular, the system 500 includes a second example of the media segment identification model(s) 160 coupled to the segment mapper 164 according to a particular implementation.

In the system 500, the input layer 404 is configured to receive a PCM speech input 504 having an input frame size 502, and the output layer 206 is configured to provide a PCM speech output 524 having an output frame size 522. In a particular implementation, the input frame size 502 matches the output frame size 522.

In some implementations, the media segment identification model(s) 160 are trained to generate an output (e.g., the media output segment identifier 162) such that the PCM speech output 524 associated with the media output segment identifier 162 matches, or substantially matches, the PCM speech input 504. In some examples, once trained, the media segment identification model(s) 160 can be used as part of a speech encoder in which the index of the activated node 202 of the input layer 204 associated with a particular PCM speech input 504 is transmitted to a decoder that includes an instance of the segment mapper 164, such as the segment mapper 172 of the device 152 of FIG. 1. Because the index of the activated node in the input layer 204 can be identified using a small number of bits as compared to the size of the PCM speech input 504, a compact representation of the PCM speech input 504 can be obtained. To illustrate, in an implementation in which the number 508 of speech frames in the segment mapper 164 (e.g., the number of memory units 116) is 360,000, the activated node can be identified using fewer than 20 bits.

In some implementations, the PCM speech output 524 is generated from high-quality pre-recorded PCM sample data represented by the weights 118 of the segment mapper 164. As a result, the system 500 enables generation of high-quality (e.g., noise reduced) output speech that corresponds to the input speech. In implementations in which the pre-recorded speech samples in the segment mapper 164 are spoken by a first person and the PCM speech input 504 is from a second person, the system 500 performs voice conversion from the second person to the first person.

In some implementations, frame-level speech continuity can be encouraged at the input layer 204 by the segment mapper 164. For example, the memory units 116 of the segment mapper 164 can be arranged so that sequential media segments that correspond to sequential segments of a recorded word or phrase correspond to sequentially indexed memory units 116. Thus, if a most recent output segment selected for the PCM speech output 524 was from memory unit i, a weighting or preference may be applied to increase the likelihood that the next output segment selected from the segment mapper 164 is from memory unit i+1. As an example, if instead of a one-hot vector, the media output segment identifier 162 indicates a set of most likely memory units to match the PCM speech input 504, and the set of most likely memory units includes a memory unit having an index that sequentially follows a most recently selected memory unit, that memory unit may be chosen even if one or more other memory units may have higher likelihood to match the PCM speech input 504. Accordingly, the segment mapper 164 (and/or the media segment identification model(s) 160 or the media stream assembler 168) can be configured to cause the system 500 to select as long of a sequence of consecutive segments as possible from the memory units 116 to minimize discontinuities in the PCM speech output 524.

Figure 6:
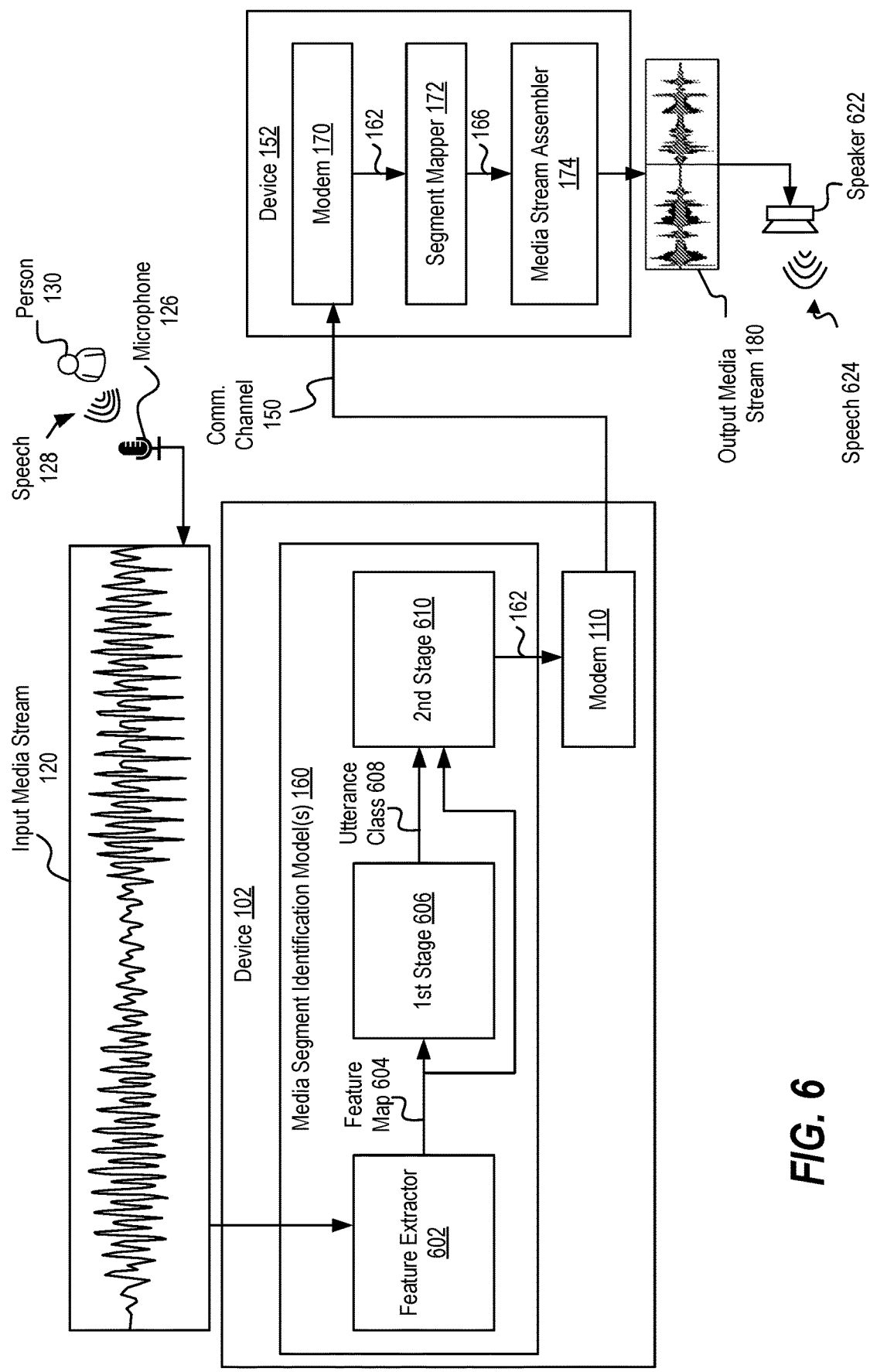
FIG. 6 is a diagram illustrating particular aspects of operations performed by the system of FIG. 1, in accordance with some examples of the present disclosure.

FIG. 6 is a diagram illustrating particular aspects of operations performed by the system of FIG. 1 to generate and use a media output segment represented by a set of weights, in accordance with some examples of the present disclosure. In particular, FIG. 6 highlights an example of communication between two devices using components of the system 100 in accordance with some implementations.

FIG. 6 illustrates examples of the media segment identification model(s) 160, the segment mapper 172, and the media stream assembler 174, of FIG. 1. In particular, the segment mapper 172 may include the features and/or perform the operations described with respect to any of FIGS. 1-5. In FIG. 6, the media segment identification model(s) 160 generate data (e.g., the media output segment identifier 162) that is used by the segment mapper 172 and the media stream assembler 174 to generate the output media stream 180.

In the example illustrated in FIG. 6, the input media stream 120 is received via the microphone 126 and includes speech 128 of the person 130. In this example, the media segment identification model(s) 160 parse the input media stream 120 into segments and provide the segments as input to a feature extractor 602. The input media stream 120 may be parsed based on time (e.g., such that each segment represents a portion of the input media stream having a specified duration) or based on content of the speech 128 (e.g., based on sounds present in the speech 128).

In the example illustrated in FIG. 6, the feature extractor 602 generates a feature map 604 based on one or more segments of the input media stream 120 and passes the feature map 604 to a first stage 606 and to a second stage 610 of the media segment identification model(s) 160. The first stage 606 determines an utterance class 608 associated with the feature map 604 and passes the utterance class 608 to the second stage 610. The second stage 610 generates the media output segment identifier 162 based on the utterance class 608 and the feature map 604.

In the example illustrated in FIG. 6, the media output segment identifier 162 is provided to the modem 110, which transmits data representing the media output segment identifier 162 over the communication channel 150 to the device 152. The media output segment identifier 162 can be viewed as a very compressed representation of particular features of the input media stream 120. For example, the input media stream 120 may include information representing every aspect of the speech 128, such as timing, pitch, volume, as well as other sounds detected by the microphone (e.g., noise or other speakers). In contrast, the media output segment identifier 162 represents specific features extracted from the input media stream, such as phonemes, biphones, or other utterance segments. Thus, the media output segment identifier 162 can be transmitted using significantly fewer communication resources (e.g., power, channel time, bits) than would be used to transmit information representing the entire waveform of the input media stream 120. To illustrate, in the experiment described above in which the media output segment identifier 162 included about 96,000 elements in a one-hot encoded vector, data representing real-time one-way voice communications could be transmitted using about 100 bits per second. As noted above, the media output segment identifier 162 used in this experiment was larger than needed; thus, even lower bit rates could be achieved by reducing the dimensionality of the media output segment identifier 162. For example, the media output segment identifier 162 could be reduced to include one element per phoneme or one element per biphone in the particular language being transmitted (e.g., by removing duplicates or near-duplicates as described above), which would further reduce the communication resources used to transmit the data representing the media output segment identifier 162.

In FIG. 6, the modem 170 receives information transmitted via the communication channel 150 and provides the media output segment identifier 162 to the segment mapper 172. The segment mapper 172 retrieves or generates a media output segment 166 based on the media output segment identifier 162. In the example illustrated in FIG. 6, the media output segment 166 corresponds to a segment of pre-recorded speech of the person 130 or of another person (e.g., a second person distinct from the person 130) making one or more sounds corresponding to sound(s) of the segment of the input media stream 120 represented by the media output segment identifier 162. The media output segment 166 is provided to the media stream assembler 174, along with other media segments to generate the output media stream 180. In the example of FIG. 6, the output media stream 180 is played out by a speaker 622 as output speech 624 representing the speech 128.

Figure 7:
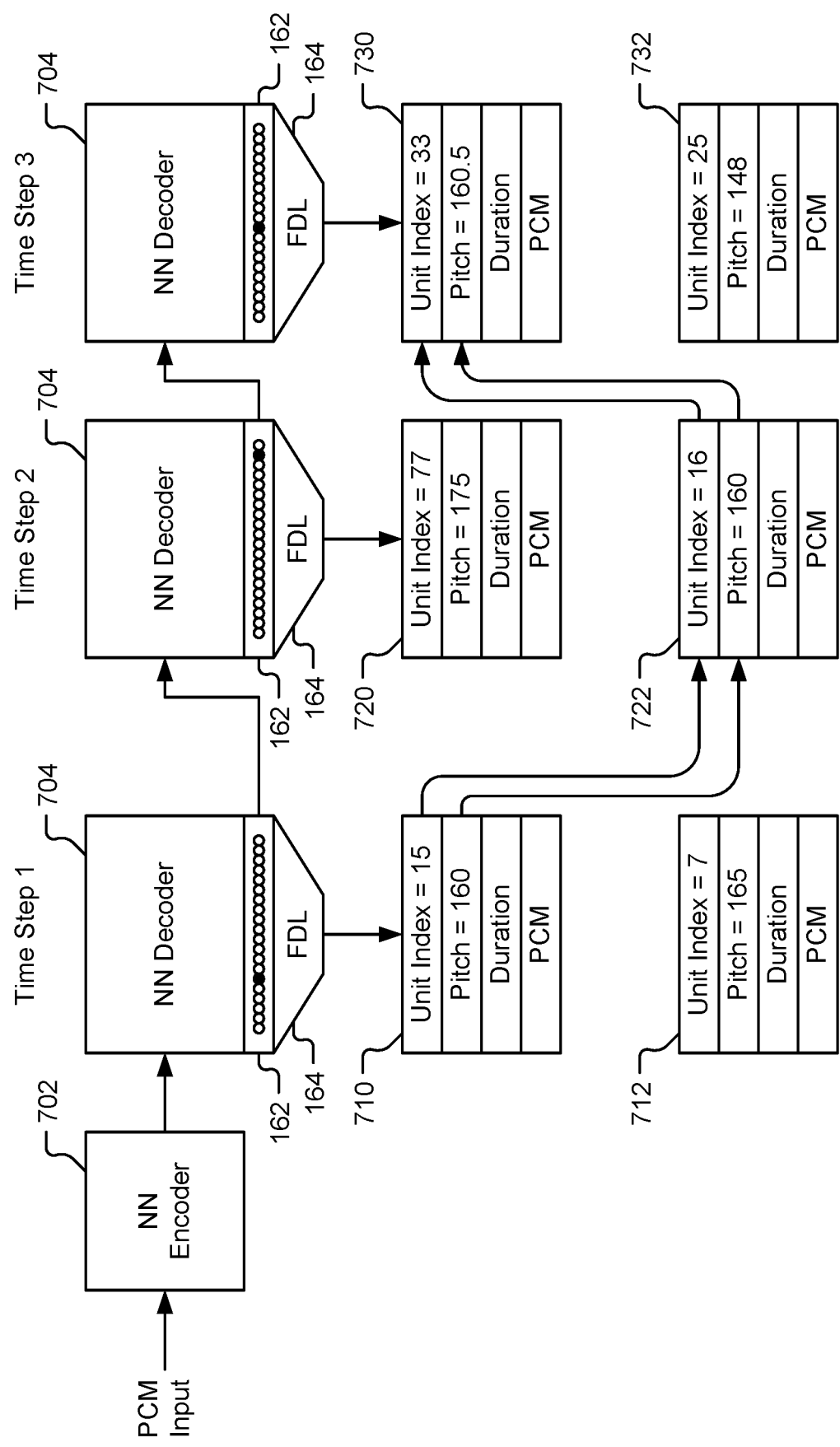
FIG. 7 is a diagram illustrating particular aspects of operations performed by the system of FIG. 1, in accordance with some examples of the present disclosure.

FIG. 7 is a diagram of particular aspects of operation of the system of FIG. 1, in accordance with some examples of the present disclosure. In particular, FIG. 7 highlights an example of operation of the segment mapper 164 according to a particular implementation of an unrolled sequence decoder.

An encoder 702, such as a neural network (NN) encoder, receives PCM inputs, such as frames of speech samples, and outputs a first encoded value for a first frame of the PCM input in a first time step ("time step 1"), a second encoded value for a second frame of the PCM input in a second time step ("time step 2"), and a third encoded value for a third frame of the PCM input in third time step ("time step 3").

In the first time step, a decoder 704, such as a neural network decoder, processes a first output of the encoder 702 corresponding to the first encoded frame and determines a pair of candidate media output segments for the first frame of the PCM input. As illustrated, the decoder 704 (e.g., the media segment identification model(s) 160) determines that a media output segment 710 is a most likely match for the first frame of the PCM input and that a media output segment 712 is a next most likely match for the first frame of the PCM input. The decoder 704 selects the media output segment 710 as being the most likely match, and also retains information regarding one or more of the media parameters of the media output segment 710 for use in decoding subsequent frames.

In the second time step, the decoder 704 determines that a media output segment 720 is a most likely match for the second frame of the PCM input and that a media output segment 722 is a next most likely match for the second frame of the PCM input. The decoder 704 selects between the media output segment 720 and the media output segment 722 at least partially based on continuity or "smoothness" of the parameters from the first time step to the second time step. As illustrated, the media output segment 722 has a pitch value of 160, which more closely matches the pitch value of the media output segment 710 (pitch=160) than does the media output segment 720 (pitch=175). Although the media output segment 720 is determined to have the highest likelihood of being the correct match to the second frame of the PCM input, the decoder 704 selects the media output segment 722 to reduce or eliminate a discontinuity in pitch between sequential output media segments that may be perceptible during playout.

In the third time step, the decoder 704 determines that a media output segment 730 is a most likely match for the third frame of the PCM input and that a media output segment 732 is a next most likely match for the third frame of the PCM input. The decoder 704 selects between the media output segment 730 and the media output segment 732 at least partially based on continuity or smoothness of the parameters from the second time step to the third time step. As illustrated, the media output segment 720 has a pitch value of 160.5, which more closely matches the pitch value of the media output segment 722 (pitch=160) than does the media output segment 732 (pitch=148). The decoder 704 selects the media output segment 730 to reduce the discontinuity in pitch between the media output segment for the second time step and the media output segment for the third time step.

Although FIG. 7 depicts minimizing discontinuities in pitch between sequential segments, it should be understood that discontinuities associated with one or more other media parameters can be evaluated instead of (or in addition to) pitch. Additionally, as described above, the decoder 704 and/or the segment mapper 164 may also select media output segments from among the potential candidates based on whether any of the memory units associated with the candidates for a given time step have index values that sequentially follow the index of the memory units for the candidates from the prior time step. For example, the candidate media output segment 722 of the second time step is associated with the memory unit having index 16, which sequentially follows the memory unit having index 15 that is associated with the candidate media output segment 710 from the first time step.

Although two candidate media output segments are depicted for each time step, in other implementations any number of candidates may be determined for each time step. In addition, although three time steps are shown, it should be understood that the decoder 704 can operate in a similar manner, selecting media output segments from among the most likely candidates, for any number of time steps.

In a particular example, rather than selecting from among candidates for a given time step based on the parameters of a selected candidate from the preceding time step, as described above, in other implementations the decoder 704 may perform a search from among the candidates for any number of time steps. To illustrate, in some implementations, the decoder 704 may perform a search, such as a beam search, that evaluates various combinations or "paths" from among the candidates and over multiple time steps and selects a sequence that provides a most likely path, such as based on a smoothness metric that is determined for each evaluated path.

Figure 8:
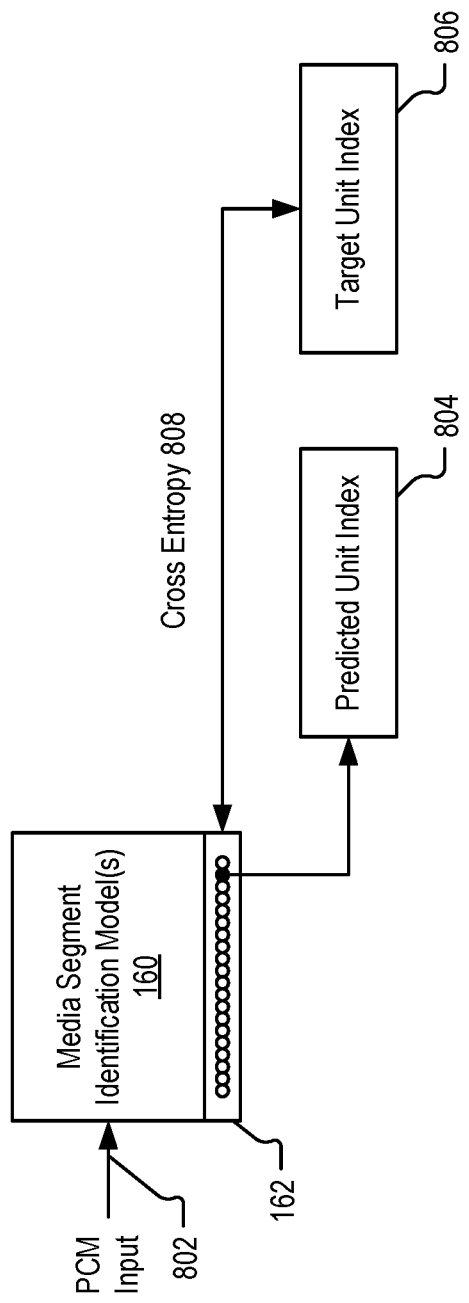
FIG. 8 is a diagram illustrating particular aspects of a training operation that may be performed in conjunction with components of the system of FIG. 1, in accordance with some examples of the present disclosure.

FIG. 8 is a diagram illustrating particular aspects of a training operation that may be performed in conjunction with components of the system of FIG. 1, in accordance with some examples of the present disclosure. In particular, FIG. 8 highlights an example of supervised training of the media segment identification model(s) 160 based on comparisons of a predicted memory unit index 804 and a target memory unit index 806.

In FIG. 8, training of the media segment identification model(s) 160 is performed using training data that includes a collection of PCM inputs 802 and indices of memory units of the segment mapper 164 that have been determined to be a good match for the PCM inputs 802. The media segment identification model(s) 160 is trained so that the predicted unit indexes 804 output by the media segment identification model(s) 160 via the media output segment identifier 162 match the target memory unit indexes 806 as accurately as possible. A metric such as cross entropy 808 is used as a loss function to guide the training of the media segment identification model(s) 160.

Figure 9:
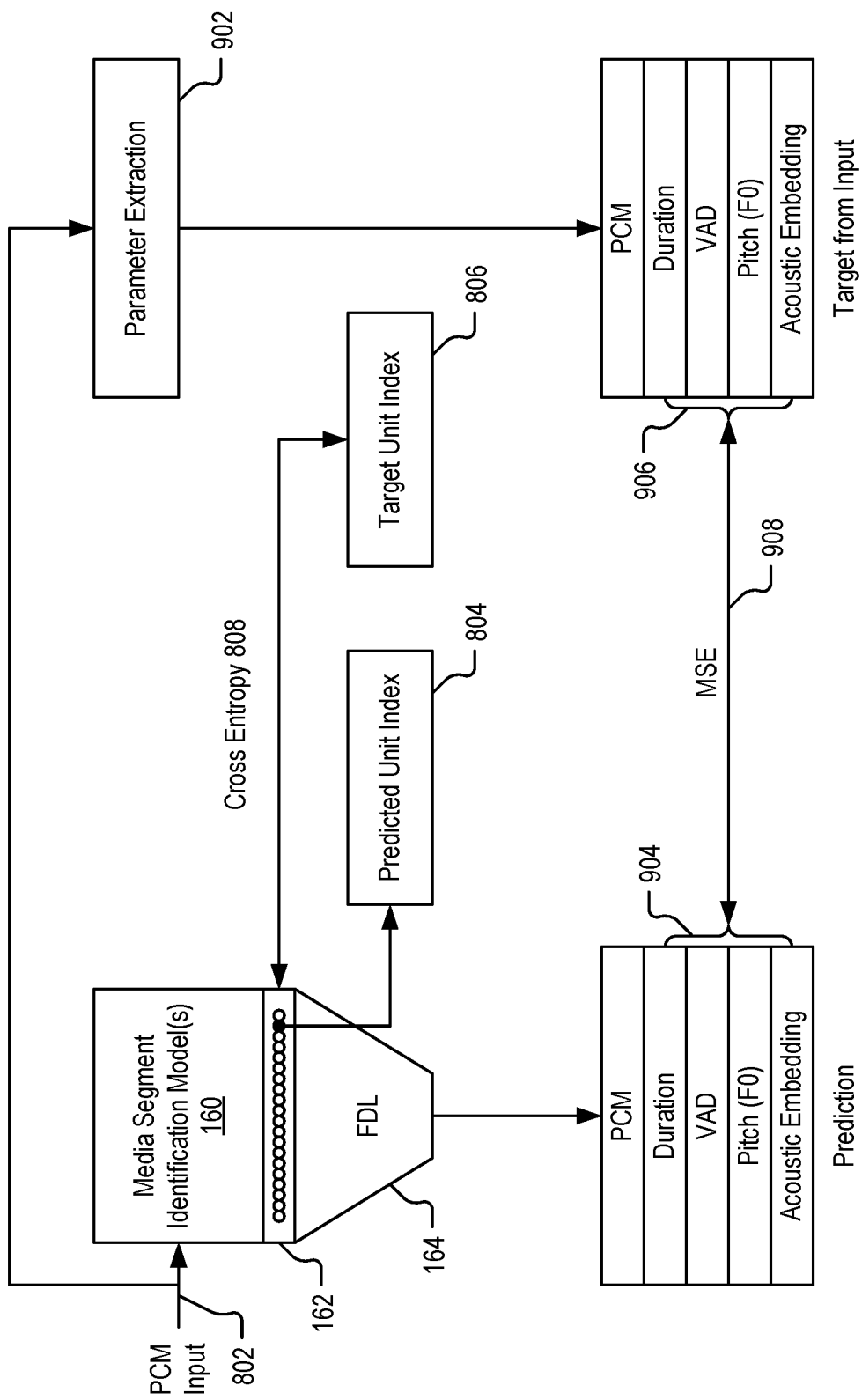
FIG. 9 is a diagram illustrating particular aspects of a training operation that may be performed in conjunction with components of the system of FIG. 1, in accordance with some examples of the present disclosure.

FIG. 9 is a diagram illustrating particular aspects of a training operation that may be performed in conjunction with components of the system of FIG. 1, in accordance with some examples of the present disclosure. In particular, FIG. 9 highlights an example of supervised training of the media segment identification model(s) 160 based on comparisons of a predicted memory unit index 804 and a target memory unit index 806, combined with unsupervised training between media parameters 904 of a predicted media segment and target media parameters 906 that are determined from a training input.

One aspect of the training operation includes using a metric, such as the cross entropy 808, as a loss function in a similar manner as described in FIG. 8. However, each memory unit index is considered 1 or 0, and cross entropy does not account for how closely the predicted media output segment associated with the predicted memory unit index 804 matches target media segment.

To account for determining how closely the predicted media output segment matches the target media segment, the media output segment identifier 162 is provided to the segment mapper 164 to retrieve the stored media parameters associated with the predicted memory unit index 804. In the event of an incorrect predicted memory unit index 804, predicted media parameters 904 associated with the incorrect predicted memory unit index 804 can be retrieved and compared to target media parameters 906 that are generated by a parameter extraction engine 902 based on the PCM input 802. For example, the PCM input 802 can be processed by the parameter extraction engine 902 to extract parameters such as duration, VAD, pitch, acoustic embeddings such as Mel-frequency cepstral coefficients (MFCCs) or some form of spectral shapes, or any other speech characteristic, for use as the target media parameters 906. Comparison of the predicted media parameters 904 to the target media parameters 906 can include determining a metric, such as an MSE 908, that can be e used to guide training by determining, for each incorrectly predicted memory unit index 804, how significant the mistake actually is in terms of signal perception.

Thus, the training operation illustrated in FIG. 9 uses the same input/output modality (e.g., speech) and the same domain (matching predicted voice to input voice), and bridges the gap between supervised learning (e.g., index prediction) and unsupervised learning (e.g., comparison of speech parameters). In addition, generating the target media parameters 906 based on the PCM input 802 enables training using unlabeled data, which may be more easily obtained and less expensive as compared to labeled data.

Figure 10:
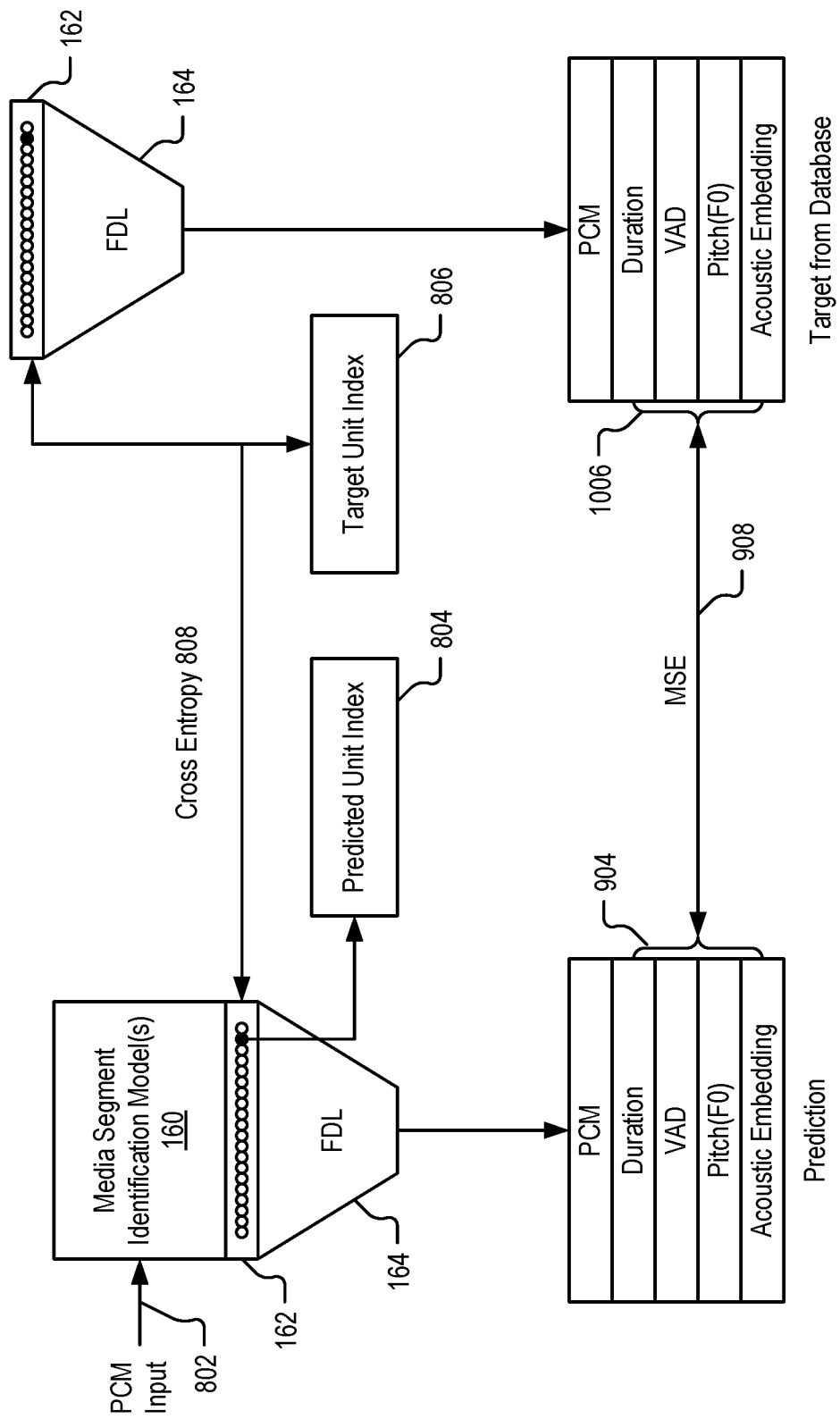
FIG. 10 is a diagram illustrating particular aspects of a training operation that may be performed in conjunction with components of the system of FIG. 1, in accordance with some examples of the present disclosure.

FIG. 10 is a diagram illustrating particular aspects of a training operation that may be performed in conjunction with components of the system of FIG. 1, in accordance with some examples of the present disclosure. In particular, FIG. 10 highlights an example of training of the media segment identification model(s) 160 based on comparisons of a predicted memory unit index 804 and a target memory unit index 806 and comparisons between media parameters 904 of a predicted media segment and target media parameters 1006 that are determined based on the target memory unit index 806.

As compared to the training operation depicted in FIG. 9, the training operation of FIG. 10 uses the target memory unit index 806 to retrieve the target media parameters 1006 for comparison to the predicted media parameters 904. For example, when training the media segment identification model(s) 160 for a voice conversion application that converts the PCM input 802 representing a male voice into output PCM samples that represent a female voice, comparisons of predicted media parameters such as pitch to media parameters extracted from the PCM input may not be particularly useful. By using the segment mapper 164 to retrieve the target media parameters 1006 based on the target memory unit index 806, comparisons can be made to determine a difference between the parameters that were predicted and the parameters that should have been predicted.

Thus, the training operation illustrated in FIG. 10 uses the same input/output modality (e.g., speech) and different domains (e.g., male input voice, female output voice). Such training can enable applications such as voice conversion and noise reduction/speech enhancement (e.g., converting noisy speech to clean speech).

Figure 11:
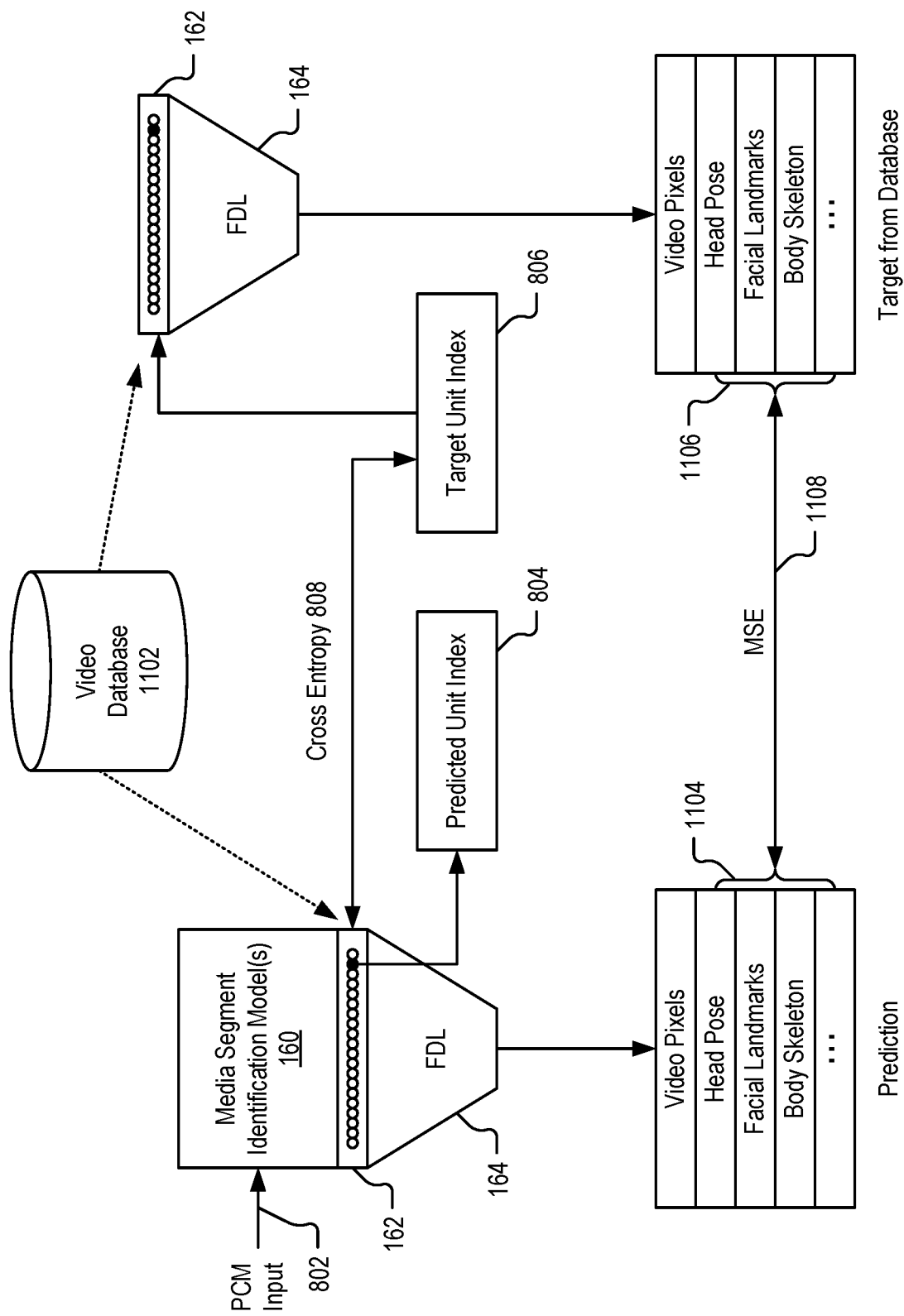
FIG. 11 is a diagram illustrating particular aspects of a training operation that may be performed in conjunction with components of the system of FIG. 1, in accordance with some examples of the present disclosure.

FIG. 11 is a diagram illustrating particular aspects of a training operation that may be performed in conjunction with components of the system of FIG. 1, in accordance with some examples of the present disclosure. In particular, FIG. 11 highlights an example of training of the media segment identification model(s) 160 based on comparisons of a predicted memory unit index 804 and a target memory unit index 806 and comparisons between media parameters 1104 of a predicted media segment and target media parameters 1106 that are determined based on the target memory unit index 806. A metric, such as an MSE 1108, can be generated to indicate difference between the media parameters 1104 of the predicted media segment and the target media parameters 1106 and used to guide training of the segment mapper 164.

As illustrated, the training operation can include comparing media parameters associated with a different modality than the training data. For example, the training data can include PCM speech input, and the media parameters 1104 associated with an incorrectly predicted memory unit index 804 can include video parameters, such as head pose, facial landmarks, body skeleton data, etc. To illustrate, the memory units 116 of the segment mapper 164 can include content of a video database 1102, such as video that is recorded while recording speech. For example, each memory unit 116 can include one image of the talker's face, represented by a subset of the weights 118 of that memory unit 116, associated with a corresponding input frame of the talker's speech. The images associated with sequential speech frames can be stitched together to generate realistic lip movements, as one particular example, which may be used in applications such as animating avatars.

Figure 12:
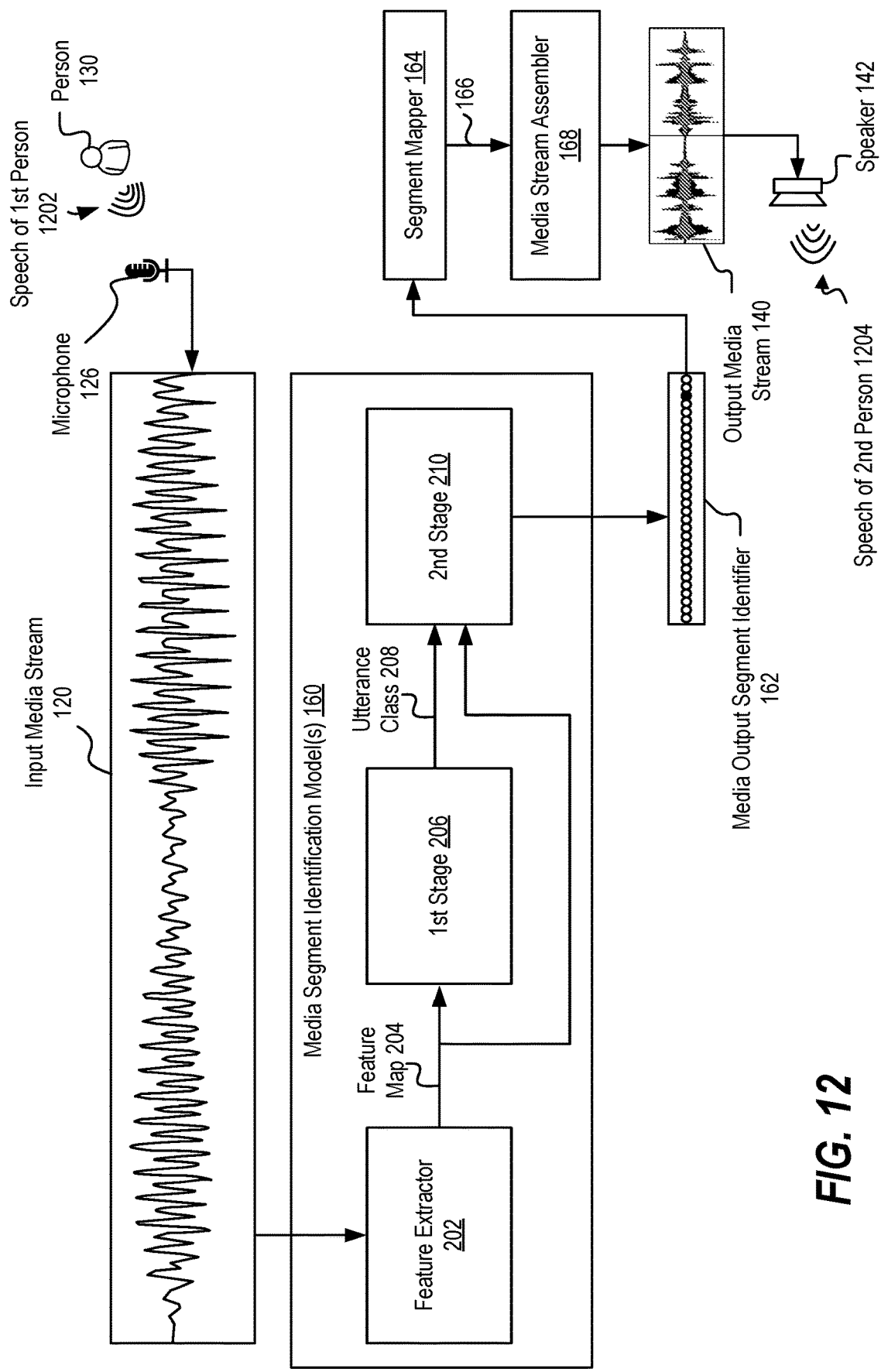
FIG. 12 is a diagram illustrating particular aspects of operations performed by the system of FIG. 1 to generate and use media output segments represented by fixed weights, in accordance with some examples of the present disclosure.

FIG. 12 is a diagram illustrating particular aspects of operations performed by the system of FIG. 1 to generate and use media output segments represented by fixed weights, in accordance with some examples of the present disclosure. In particular, FIG. 12 highlights a first example of voice modification using components of the system 100 in accordance with some implementations.

FIG. 12 illustrates examples of the media segment identification model(s) 160, the segment mapper 164, and the media stream assembler 168, each of which may include the features and/or perform the operations described with respect to any of FIGS. 1-11. For example, in FIG. 12, the media segment identification model(s) 160 include the feature extractor 602, the first stage 606, and the second stage 610. Additionally, the media segment identification model(s) 160 generate data (e.g., the media output segment identifier 162) that is used by the segment mapper 164 and the media stream assembler 168 to generate the output media stream 140.

In the example illustrated in FIG. 12, the input media stream 120 is received via the microphone 126 and includes speech of a first person 1202 (e.g., the person 130). In this example, the media segment identification model(s) 160 parse the input media stream 120 into segments and provide the segments as input to the feature extractor 602. The input media stream 120 may be parsed based on time (e.g., such that each segment represents a portion of the input media stream having a specified duration) or based on content of the speech of the first person 1202 (e.g., based on sounds present in the speech of the first person 1202).

In the example illustrated in FIG. 12, the feature extractor 602 generates the feature map 604 based on one or more segments of the input media stream 120 and passes the feature map 604 to the first stage 606 and to the second stage 610. The first stage 606 determines an utterance class 608 associated with the feature map 604 and passes the utterance class 608 to the second stage 610. The second stage 610 generates the media output segment identifier 162 based on the utterance class 608 and the feature map 604.

The segment mapper 164 retrieves or generates a media output segment 166 based on the media output segment identifier 162. In the example illustrated in FIG. 6, the media output segment 166 corresponds to a segment of prerecorded speech of another person (e.g., a second person distinct from the person 130) making one or more sounds corresponding to sound(s) of the segment of the input media stream 120 represented by the media output segment identifier 162. The media output segment 166 is provided to the media stream assembler 168, along with other media segments to generate the output media stream 140. In the example of FIG. 6, the output media stream 140 is played out by the speaker 142 as output representing speech of a second person 1204. Thus, the speech of the first person 1202 is used to generate corresponding speech of a second person 1204 (e.g. to perform voice conversion).

Figure 13:
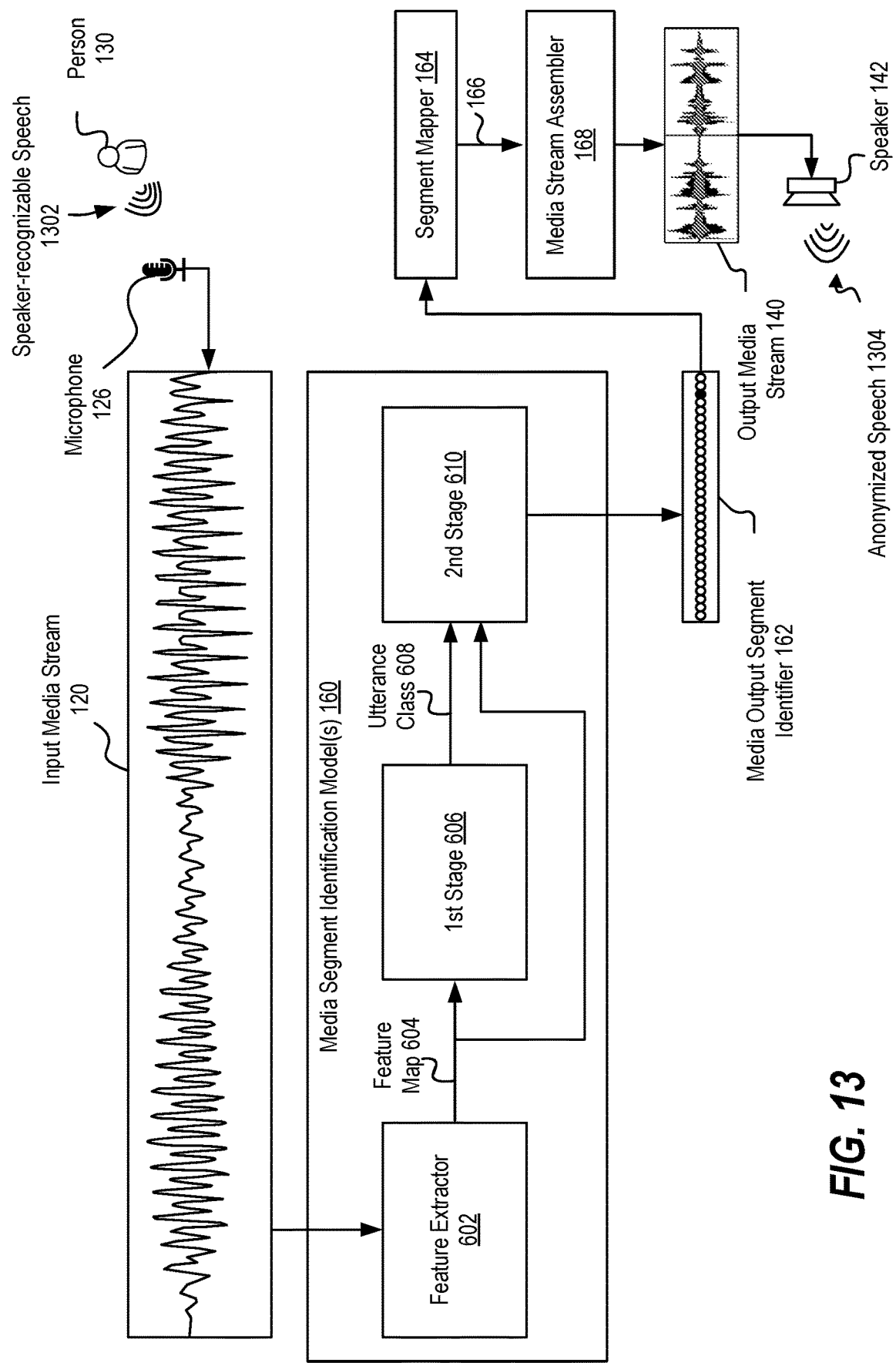
FIG. 13 is a diagram illustrating particular aspects of operations performed by the system of FIG. 1 to generate and use media output segments represented by fixed weights, in accordance with some examples of the present disclosure.

FIG. 13 is a diagram illustrating particular aspects of operations performed by the system of FIG. 1 to generate and use media output segments represented by fixed weights, in accordance with some examples of the present disclosure. In particular, FIG. 13 highlights a second example of voice modification using components of the system 100 in accordance with some implementations.

FIG. 13 illustrates examples of the media segment identification model(s) 160, the segment mapper 164, and the media stream assembler 168, each of which may include the features and/or perform the operations described with respect to any of FIGS. 1-11. For example, in FIG. 13, the media segment identification model(s) 160 include the feature extractor 602, the first stage 606, and the second stage 610. Additionally, the media segment identification model(s) 160 generate data (e.g., the media output segment identifier 162) that is used by the segment mapper 164 and the media stream assembler 168 to generate the output media stream 140.

In the example illustrated in FIG. 13, the input media stream 120 is received via the microphone 126 and includes speaker-recognizable speech 1302 of the person 130. In this example, the media segment identification model(s) 160 parse the input media stream 120 into segments and provide the segments as input to the feature extractor 602. The input media stream 120 may be parsed based on time (e.g., such that each segment represents a portion of the input media stream having a specified duration) or based on content of the speaker-recognizable speech 1302 (e.g., based on sounds present in the speaker-recognizable speech 1302).

In the example illustrated in FIG. 13, the feature extractor 602 generates the feature map 604 based on one or more segments of the input media stream 120 and passes the feature map 604 to the first stage 606 and to the second stage 610. The first stage 606 determines an utterance class 608 associated with the feature map 604 and passes the utterance class 608 to the second stage 610. The second stage 610 generates the media output segment identifier 162 based on the utterance class 608 and the feature map 604.

The segment mapper 164 retrieves or generates a media output segment 166 based on the media output segment identifier 162. In the example illustrated in FIG. 13, the media segment identification model(s) 160 generate a series of media output segment identifiers 162 based on a series of segments of the input media stream 120, and the segment mapper 164 generates or retrieves media output segments 166 associated with different talkers for different media output segment identifiers 162 of the series of media output segment identifiers 162. For example, the segment mapper 164 may be configured to generate or retrieve first media output segments 166 corresponding to pre-recorded speech of a second person (e.g., a second person distinct from the person 130) and to generate or retrieve second media output segments 166 corresponding to pre-recorded speech of a third person (e.g., a third person distinct from the person 130 and distinct from the second person). In this example, the segment mapper 164 may alternate between first media output segments 166 and the second media output segments 166. In this example, the output media stream 140, when played out by the speaker 142, represents anonymized speech 1304 that is not recognizable as speech of the person 130 and that is also not recognizable as speech of the second person or as speech of the third person.

Although the example above refers to alternating between first media output segments 166 associated with speech of a second person and the second media output segments 166 associated with speech of a third person, in other implementations, the segment mapper 164 may change between sets of media output segments 166 associated with more than two different people. Additionally, or alternatively, the segment mapper 164 may change between sets of media output segments 166 in a different pattern than alternating with each media output segment identifier 162. For example, the segment mapper 164 may randomly select, from among a plurality of sets of media output segments associated with different people, a particular set of media output segments from which the media output segment 166 is retrieved or generated based on the media output segment identifier 162. To illustrate, when a media output segment identifier 162 is output by the media segment identification model(s) 160, the segment mapper 164 (or another component of the device 102 of FIG. 1) selects a talker (e.g., a person whose pre-recorded speech is to be used). In this illustrative example, the segment mapper 164 generates or retrieves the media output segment 166 based on the output segment data 114 (e.g., sets of weights 118 shown in FIG. 1) for the selected talker.

Figure 14:
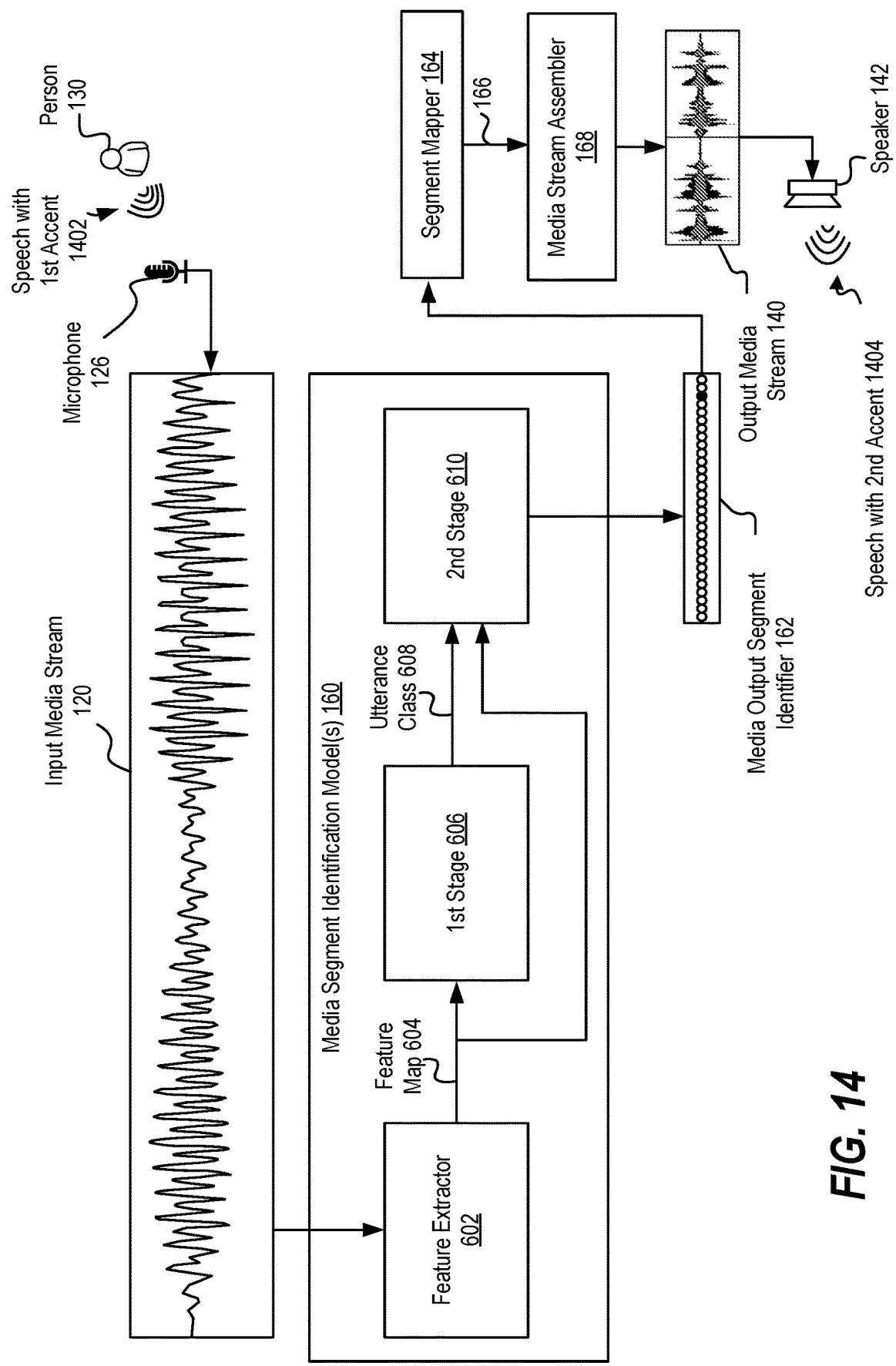
FIG. 14 is a diagram illustrating particular aspects of operations performed by the system of FIG. 1 to generate and use media output segments represented by fixed weights, in accordance with some examples of the present disclosure.

FIG. 14 is a diagram illustrating particular aspects of operations performed by the system of FIG. 1 to generate and use media output segments represented by fixed weights, in accordance with some examples of the present disclosure. In particular, FIG. 14 highlights a third example of voice modification using components of the system 100 in accordance with some implementations.

FIG. 14 illustrates examples of the media segment identification model(s) 160, the segment mapper 164, and the media stream assembler 168, each of which may include the features and/or perform the operations described with respect to any of FIGS. 1-11. For example, in FIG. 14, the media segment identification model(s) 160 include the feature extractor 602, the first stage 606, and the second stage 610. Additionally, the media segment identification model(s) 160 generate data (e.g., the media output segment identifier 162) that is used by the segment mapper 164 and the media stream assembler 168 to generate the output media stream 140.

In the example illustrated in FIG. 14, the input media stream 120 is received via the microphone 126 and includes speech with a first accent 1402 (e.g., speech of the person 130, where the person 130 speaks with the first accent). In this example, the media segment identification model(s) 160 parse the input media stream 120 into segments and provide the segments as input to the feature extractor 602. The input media stream 120 may be parsed based on time (e.g., such that each segment represents a portion of the input media stream having a specified duration) or based on content of the speech with the first accent 1402 (e.g., based on sounds present in the speech with the first accent 1402).

In the example illustrated in FIG. 14, the feature extractor 602 generates the feature map 604 based on one or more segments of the input media stream 120 and passes the feature map 604 to the first stage 606 and to the second stage 610. The first stage 606 determines an utterance class 608 associated with the feature map 604 and passes the utterance class 608 to the second stage 610. The second stage 610 generates the media output segment identifier 162 based on the utterance class 608 and the feature map 604.

The segment mapper 164 retrieves or generates a media output segment 166 based on the media output segment identifier 162. In the example illustrated in FIG. 14, the media output segment 166 corresponds to a segment of pre-recorded speech of a person speaking with a second accent (e.g., a second person distinct from the person 130 or the person 130 speaking without the first accent) making one or more sounds corresponding to sound(s) of the segment of the input media stream 120 represented by the media output segment identifier 162. The media output segment 166 is provided to the media stream assembler 168, along with other media segments to generate the output media stream 140. In the example of FIG. 14, the output media stream 140 is played out by the speaker 142 as output representing speech with a second accent 1404. Thus, the speech with the first accent 1402 is used to generate corresponding speech with the second accent 1404.

Figure 15:
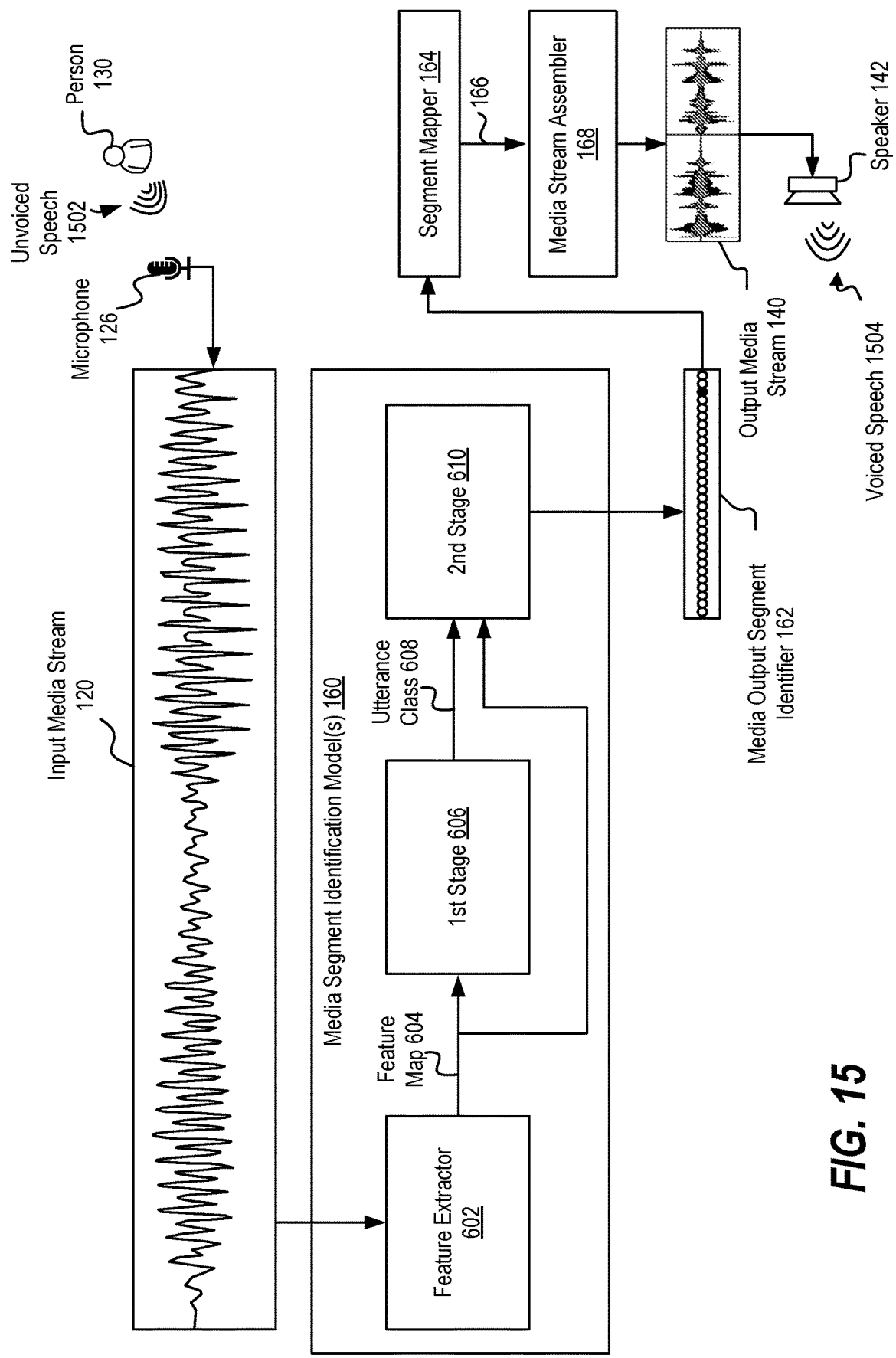
FIG. 15 is a diagram illustrating particular aspects of operations performed by the system of FIG. 1 to generate and use media output segments represented by fixed weights, in accordance with some examples of the present disclosure.

FIG. 15 is a diagram illustrating particular aspects of operations performed by the system of FIG. 1 to generate and use media output segments represented by fixed weights, in accordance with some examples of the present disclosure. In particular, FIG. 15 highlights a fourth example of voice modification using components of the system 100 in accordance with some implementations.

FIG. 15 illustrates examples of the media segment identification model(s) 160, the segment mapper 164, and the media stream assembler 168, each of which may include the features and/or perform the operations described with respect to any of FIGS. 1-11. For example, in FIG. 15, the media segment identification model(s) 160 include the feature extractor 602, the first stage 606, and the second stage 610. Additionally, the media segment identification model(s) 160 generate data (e.g., the media output segment identifier 162) that is used by the segment mapper 164 and the media stream assembler 168 to generate the output media stream 140.

In the example illustrated in FIG. 15, the input media stream 120 is received via the microphone 126 and includes unvoiced speech 1502 (e.g., whispered speech of the person 130). In this example, the media segment identification model(s) 160 parse the input media stream 120 into segments and provide the segments as input to the feature extractor 602. The input media stream 120 may be parsed based on time (e.g., such that each segment represents a portion of the input media stream having a specified duration) or based on content of the unvoiced speech 1502 (e.g., based on sounds present in the unvoiced speech 1502).

In the example illustrated in FIG. 15, the feature extractor 602 generates the feature map 604 based on one or more segments of the input media stream 120 and passes the feature map 604 to the first stage 606 and to the second stage 610. The first stage 606 determines an utterance class 608 associated with the feature map 604 and passes the utterance class 608 to the second stage 610. The second stage 610 generates the media output segment identifier 162 based on the utterance class 608 and the feature map 604.

The segment mapper 164 retrieves or generates a media output segment 166 based on the media output segment identifier 162. In the example illustrated in FIG. 15, the media output segment 166 corresponds to a segment of pre-recorded voiced speech including one or more sounds corresponding to sound(s) of the segment of the input media stream 120 represented by the media output segment identifier 162. The voiced speech may be pre-recorded by the person 130 or by another person. The media output segment 166 is provided to the media stream assembler 168, along with other media segments to generate the output media stream 140. In the example of FIG. 15, the output media stream 140 is played out by the speaker 142 as output representing voiced speech 1504 based on unvoiced speech 1502 in the input media stream 120. Although FIG. 15 is illustrated as generating voiced speech 1504 based on unvoiced speech 1502, in other implementations, unvoiced speech 1502 can be generated based on voiced speech 1504.

Figure 16:
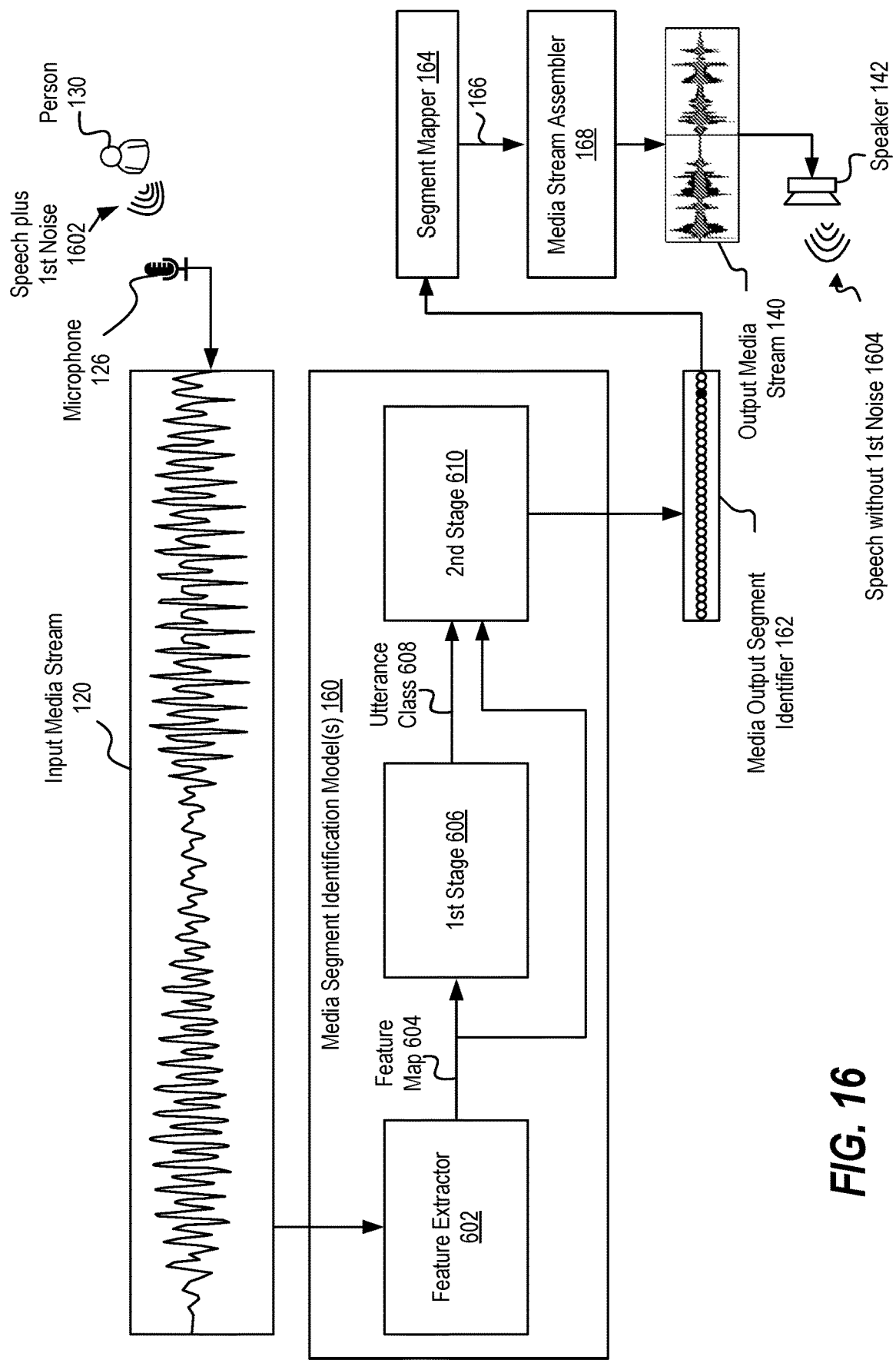
FIG. 16 is a diagram illustrating particular aspects of operations performed by the system of FIG. 1 to generate and use media output segments represented by fixed weights, in accordance with some examples of the present disclosure.

FIG. 16 is a diagram illustrating particular aspects of operations performed by the system of FIG. 1 to generate and use media output segments represented by fixed weights, in accordance with some examples of the present disclosure. In particular, FIG. 16 highlights an example of noise reduction using components of the system 100 in accordance with some implementations.

FIG. 16 illustrates examples of the media segment identification model(s) 160, the segment mapper 164, and the media stream assembler 168, each of which may include the features and/or perform the operations described with respect to any of FIGS. 1-11. For example, in FIG. 16, the media segment identification model(s) 160 include the feature extractor 602, the first stage 606, and the second stage 610. Additionally, the media segment identification model(s) 160 generate data (e.g., the media output segment identifier 162) that is used by the segment mapper 164 and the media stream assembler 168 to generate the output media stream 140.

In the example illustrated in FIG. 16, the input media stream 120 is received via the microphone 126 and includes speech with noise 1602. In this example, the media segment identification model(s) 160 parse the input media stream 120 into segments and provide the segments as input to the feature extractor 602. The input media stream 120 may be parsed based on time (e.g., such that each segment represents a portion of the input media stream 120 having a specified duration) or based on content of the input media stream 120 (e.g., based on sounds present in the speech with the first noise 1602).

In the example illustrated in FIG. 16, the feature extractor 602 generates the feature map 604 based on one or more segments of the input media stream 120 and passes the feature map 604 to the first stage 606 and to the second stage 610. The first stage 606 determines an utterance class 608 associated with the feature map 604 and passes the utterance class 608 to the second stage 610. The second stage 610 generates the media output segment identifier 162 based on the utterance class 608 and the feature map 604.

The segment mapper 164 retrieves or generates a media output segment 166 based on the media output segment identifier 162. In the example illustrated in FIG. 16, the media output segment 166 corresponds to a segment of pre-recorded speech without the noise and includes one or more sounds corresponding to sound(s) of the segment of the input media stream 120 represented by the media output segment identifier 162. The speech may be pre-recorded by the person 130 or by another person. The media output segment 166 is provided to the media stream assembler 168, along with other media segments to generate the output media stream 140. In the example of FIG. 16, the output media stream 140 is played out by the speaker 142 as output representing speech without the first noise 1604.

Figure 17:
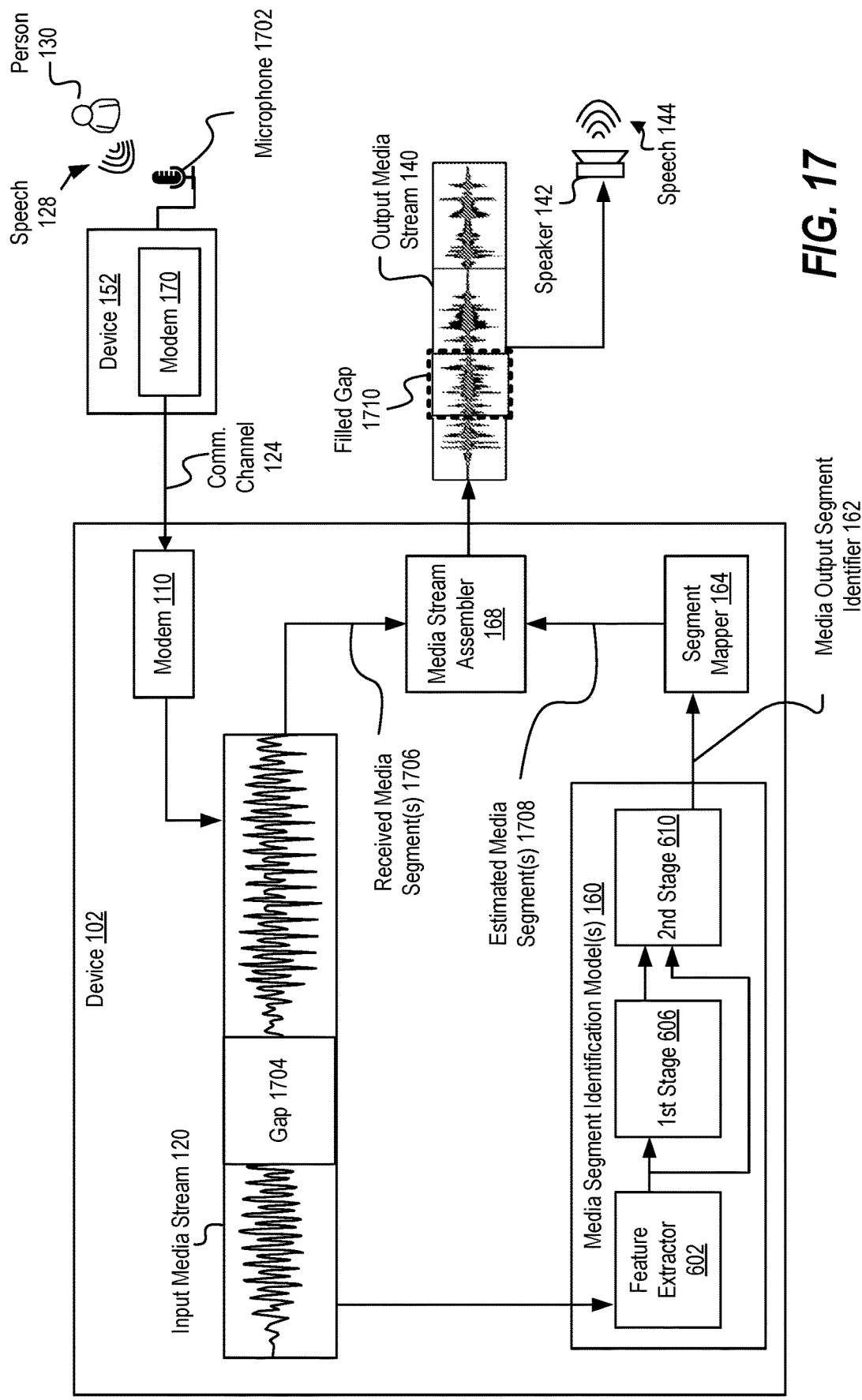
FIG. 17 is a diagram illustrating particular aspects of operations performed by the system of FIG. 1 to generate and use media output segments represented by fixed weights, in accordance with some examples of the present disclosure.

FIG. 17 is a diagram illustrating particular aspects of operations performed by the system of FIG. 1 to generate and use media output segments represented by fixed weights, in accordance with some examples of the present disclosure. In particular, FIG. 17 highlights a second example of communication between two devices using components of the system 100 in accordance with some implementations.

FIG. 17 illustrates examples of the media segment identification model(s) 160, the segment mapper 164, and the media stream assembler 168, each of which may include the features and/or perform the operations described with respect to any of FIGS. 1-11. For example, in FIG. 17, the media segment identification model(s) 160 include the feature extractor 602, the first stage 606, and the second stage 610. Additionally, the media segment identification model(s) 160 generate data (e.g., the media output segment identifier 162) that is used by the segment mapper 164 and the media stream assembler 168 to generate the output media stream 140.

In the example illustrated in FIG. 17, the input media stream 120 is received via the communication channel 124. For example, a microphone 1702 of the device 152 receives audio data (e.g., an audio waveform) that includes speech 128 of the person 130 and may also include other sounds (e.g., background noise, etc.). The device 152 encodes the audio data (e.g., the entire audio waveform or one or more subbands of the waveform) using a speech or audio codec (such as a voice-over-internet protocol codec), and the modem 170 of the device 152 sends data packets including the encoded audio data to the device 102.

In the example illustrated in FIG. 17, the device 102 is configured to receive the audio data transmitted by the device 152 as the input media stream 120 and to generate the output media stream 140 based on the received audio data. For example, audio data received from the device 152 may be provided to the media stream assembler 168 as received media segments 1706.

In some circumstances, a portion of the input media stream 120 may be disrupted. For example, one or more data packets transmitted by the device 152 may be lost or corrupted, leaving a gap 1704 in the input media stream 120. In such circumstances, the media segment identification model(s) 160 and the segment mapper 164 can be used together to generate estimated media segments 1708 to fill in for the missing audio data associated with the gap 1704.

For example, the input media stream 120 can be provided as input to the media segment identification model(s) 160. The media segment identification model(s) 160 parse the input media stream 120 into segments and provide the segments as input to the feature extractor 602. The input media stream 120 may be parsed based on time (e.g., such that each segment represents a portion of the input media stream having a specified duration) or based on content of the speech 128 (e.g., based on sounds present in the speech 128).

In the example illustrated in FIG. 17, the feature extractor 602 generates the feature map 604 based on one or more segments of the input media stream 120 and passes the feature map 604 to the first stage 606 and to the second stage 610. The first stage 606 determines an utterance class 608 associated with the feature map 604 and passes the utterance class 608 to the second stage 610. The second stage 610 generates the media output segment identifier 162 based on the utterance class 608 and the feature map 604. In the example illustrated in FIG. 12, one or more of the media segment identification model(s) 160 (e.g., the feature extractor 602, the first stage 606, the second stage 610, or a combination thereof) is a temporally dynamic model that generates as output a prediction based on input that includes a temporal context. For example, although audio content associated with the gap 1704 is not available, the media segment identification model(s) 160 can generate an estimate of the media output segment identifier 162 associated with audio of the gap 1704 because the media segment identification model(s) 160 have been trained using normal speech. In some implementations, the estimates of the media output segment identifier 162 generated by the media segment identification model(s) 160 can be improved by training the media segment identification model(s) 160 using training data that includes occasional gaps, similar to the gap 1704.

In the example illustrated in FIG. 17, the estimate of the media output segment identifier 162 is provided to segment mapper 164 to generate or retrieve an estimated media segment 1708 corresponding to the gap 1704. In this example, the media stream assembler 168 generates that output media stream 140 using the received media segments 1706, and fills any gaps (e.g., the gap 1704) using estimated media segments 1708. The output media stream 140 with one or more filled gaps 1710 can be provided to the speaker 142 to generate output including a representation of the speech 144.

Thus, the system 100 can be used to improve audio quality of output of a receiving device in the event that one or more packets of audio data are not available for playback due to packet loss or packet corruption.

Figure 18:
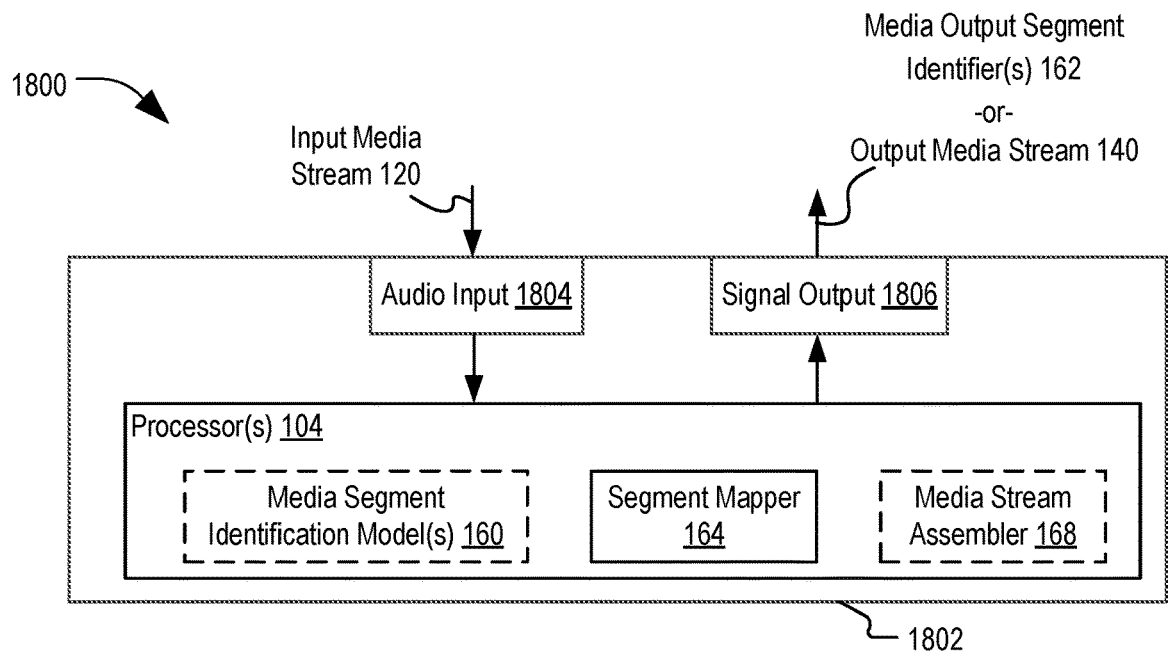
FIG. 18 illustrates an example of an integrated circuit operable to represent media segments using sets of weights, in accordance with some examples of the present disclosure.
Figure 22:
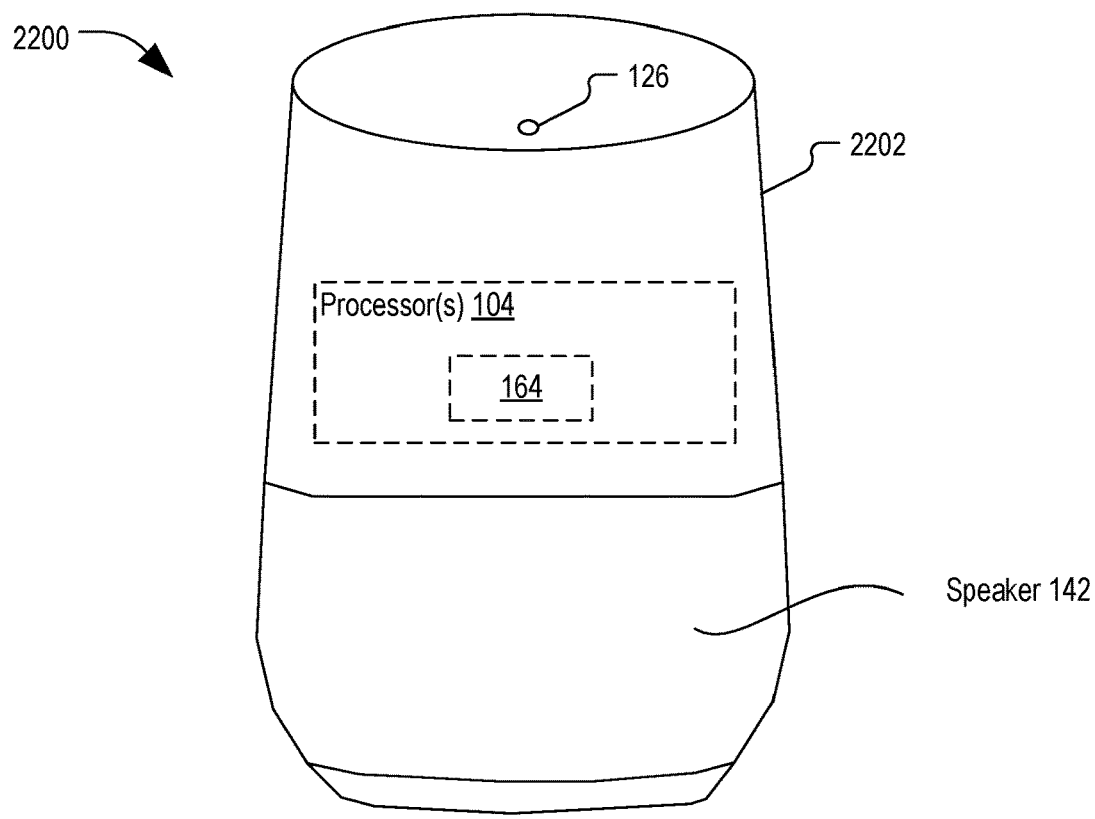
FIG. 22 is a diagram of a voice-controlled speaker system operable to represent media segments using sets of weights, in accordance with some examples of the present disclosure.
Figure 23:
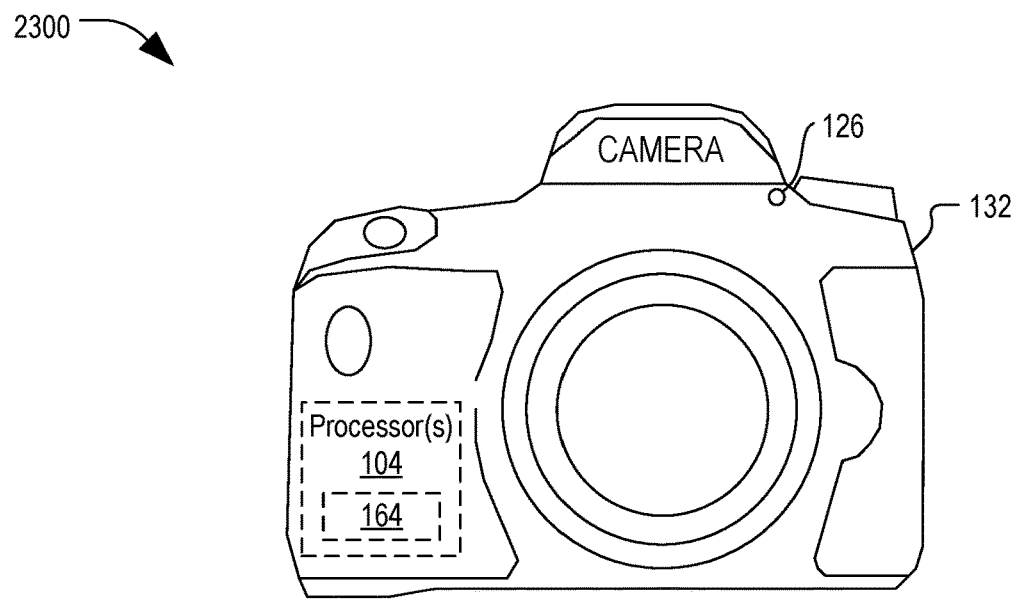
FIG. 23 is a diagram of a camera operable to represent media segments using sets of weights, in accordance with some examples of the present disclosure.
Figure 24:
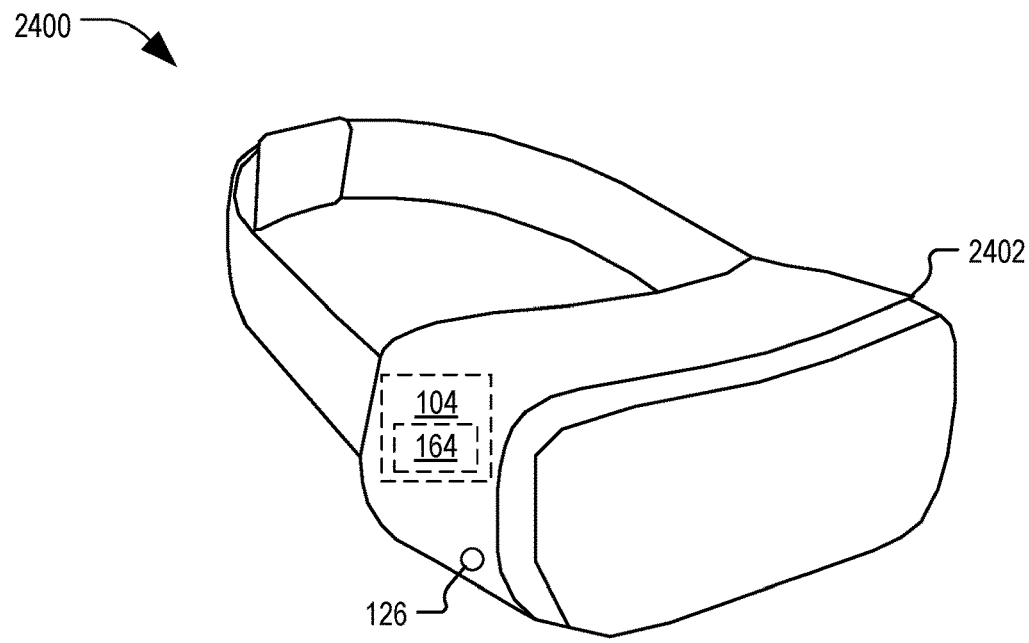
FIG. 24 is a diagram of a headset, such as a virtual reality, mixed reality, or augmented reality headset, operable to represent media segments using sets of weights, in accordance with some examples of the present disclosure.
Figure 25:
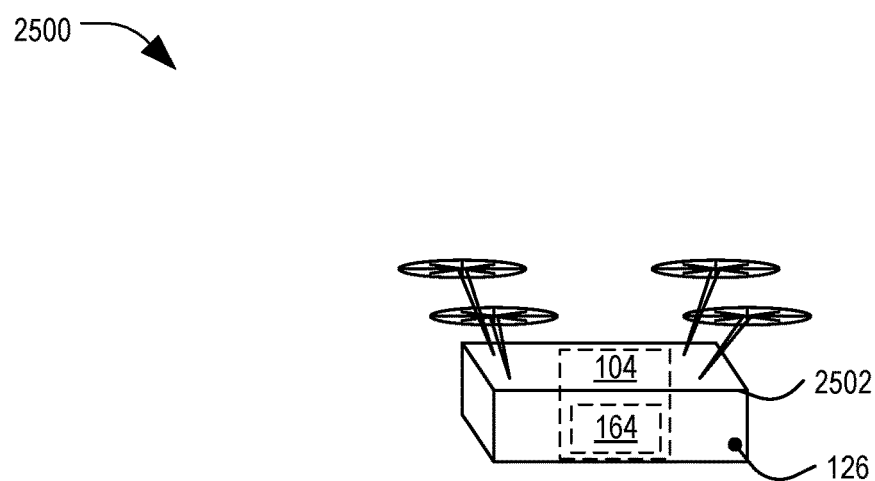
FIG. 25 is a diagram of a first example of a vehicle operable to represent media segments using sets of weights, in accordance with some examples of the present disclosure.
Figure 26:
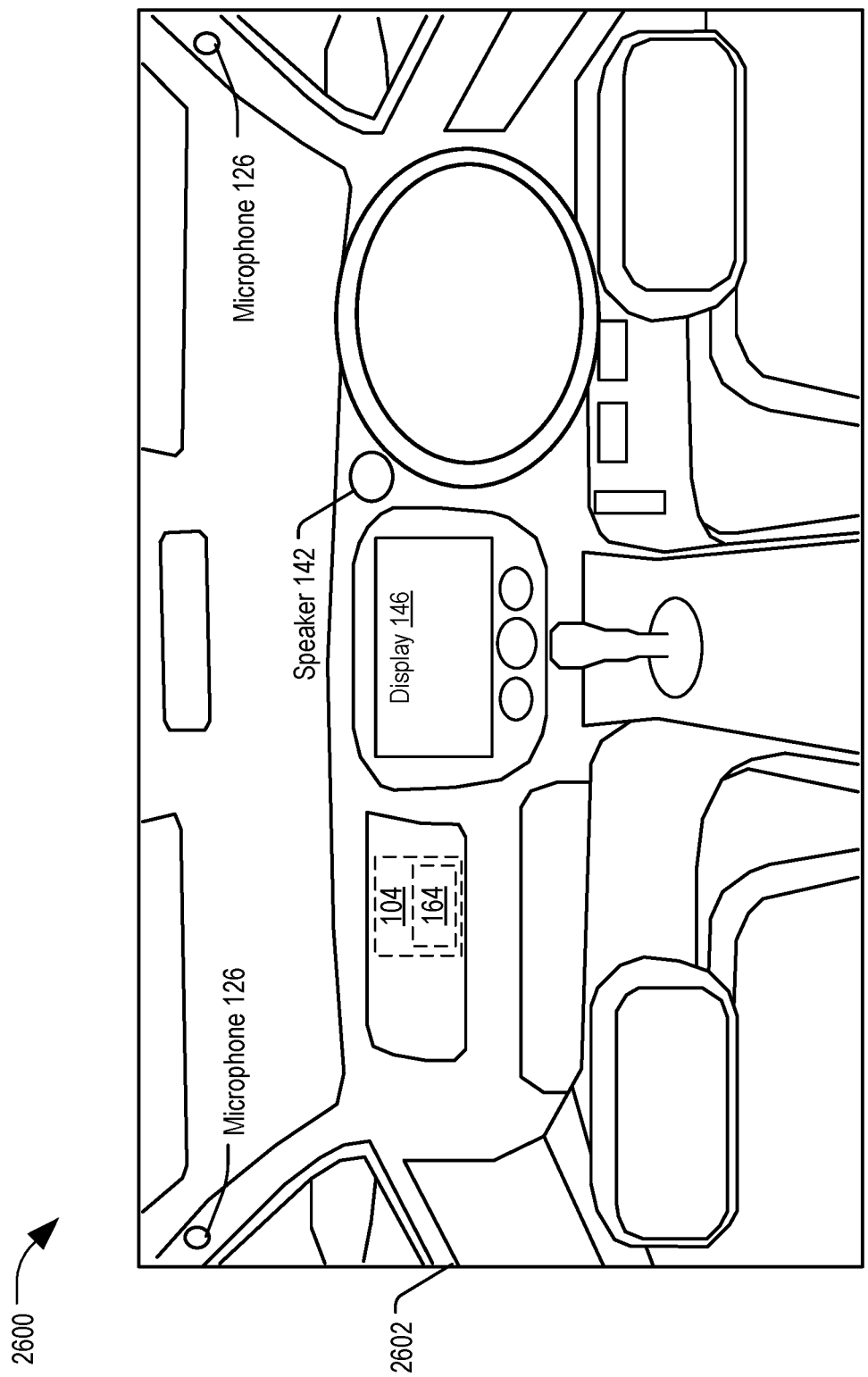
FIG. 26 is a diagram of a second example of a vehicle operable to represent media segments using sets of weights, in accordance with some examples of the present disclosure.

FIG. 18 depicts an implementation 1800 of the device 102 as an integrated circuit 1802 that includes the one or more processors 104. The integrated circuit 1802 also includes an audio input 1804, such as one or more bus interfaces, to enable the input media stream 120 to be received for processing. The integrated circuit 1802 also includes a signal output 1806, such as a bus interface, to enable sending of an output signal, such as the output media stream 140 or the media output segment identifier(s) 162. In the example illustrated in FIG. 18, the processor(s) 104 include the segment mapper 164, and optionally, include the media segment identification model(s) 160 and the media stream assembler 168. The integrated circuit 1802 enables implementation of operations to generate and use a media output segment identifier as a component in a system that includes microphones, such as a mobile phone or tablet as depicted in FIG. 19, a headset as depicted in FIG. 20, a wearable electronic device as depicted in FIG. 21, a voice-controlled speaker system as depicted in FIG. 22, a camera as depicted in FIG. 23, a virtual reality, mixed reality, or augmented reality headset as depicted in FIG. 24, or a vehicle as depicted in FIG. 25 or FIG. 26.

Figure 19:
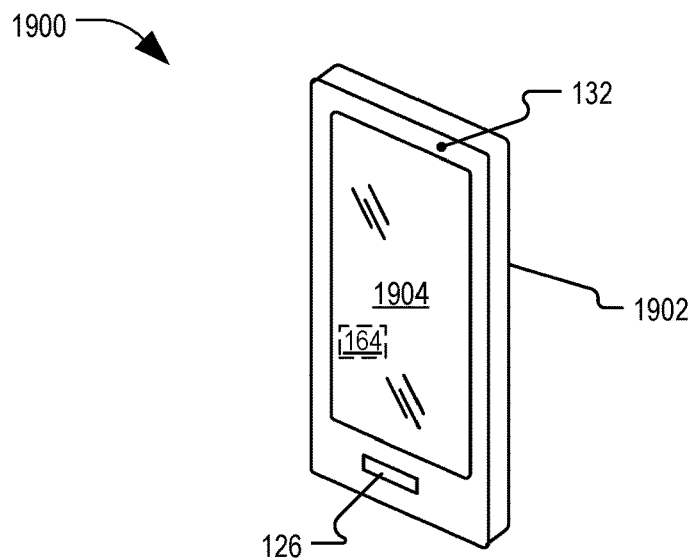
FIG. 19 is a diagram of a mobile device operable to represent media segments using sets of weights, in accordance with some examples of the present disclosure.

FIG. 19 depicts an implementation 1900 in which the device 102 includes a mobile device 1902, such as a phone or tablet, as illustrative, non-limiting examples. The mobile device 1902 includes the microphone 126, the camera 132, and a display screen 1904. Components of the processor(s) 104, including the segment mapper 164 and optionally the media segment identification model(s) 160 and the media stream assembler 168, are integrated in the mobile device 1902 and are illustrated using dashed lines to indicate internal components that are not generally visible to a user of the mobile device 1902. In a particular example, the segment mapper 164 operates to generate media output segments corresponding to segments of an input media stream. For example, the microphone 126 may capture speech of a user of the mobile device 1902, and the segment mapper 164 may generate media output segments corresponding to phonemes or other utterance segments of the speech. Media segment identifiers, such as indices of memory units of the segment mapper 164, may be used at the mobile device 1902 or transmitted to another mobile device to generate an output media stream. Additionally, or alternatively, in some examples, the mobile device 1902 may receive an input media stream from another device, and the segment mapper 164 may operate to generate estimated media segments to fill gaps in the output media stream due to missing or corrupt packets of the input media stream.

Figure 20:
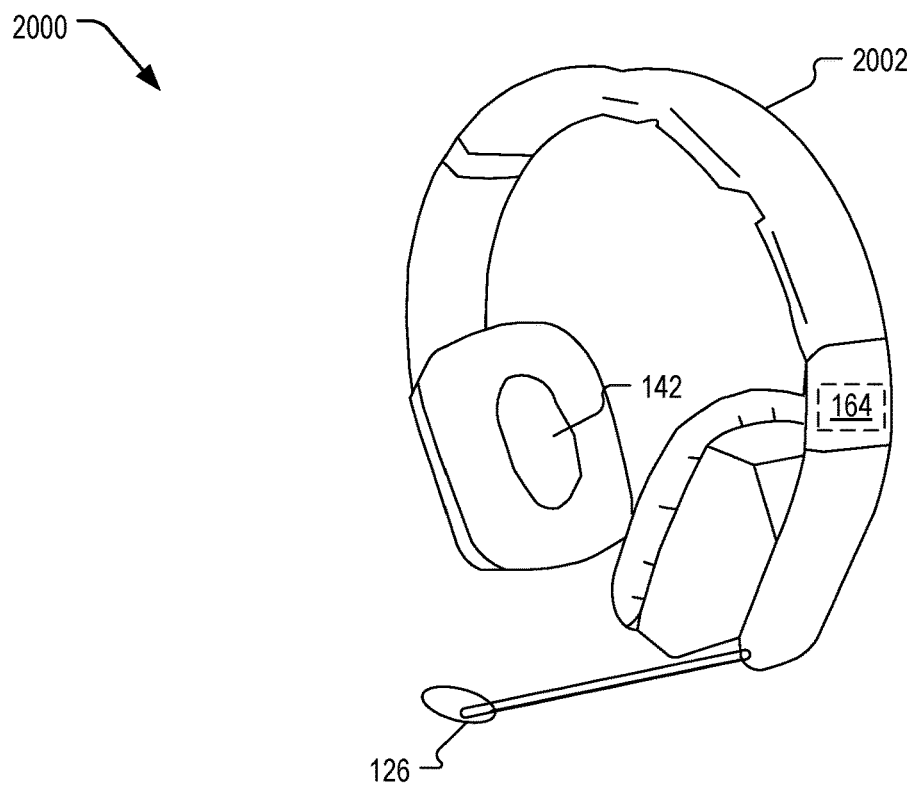
FIG. 20 is a diagram of a headset operable to represent media segments using sets of weights, in accordance with some examples of the present disclosure.

FIG. 20 depicts an implementation 2000 in which the device 102 includes a headset device 2002. The headset device 2002 includes the microphone 126. Components of the processor(s) 104, including the segment mapper 164 and optionally the media segment identification model(s) 160 and the media stream assembler 168, are integrated in the headset device 2002. In a particular example, the segment mapper 164 operates to generate media output segments corresponding to segments of an input media stream. For example, the microphone 126 may capture speech of a user of the headset device 2002 and may generate media output segments representing phonemes or other utterance segments of the speech. The media output segments may be used to generate an output media stream from one or more speakers 142 of the headset device 2002, or media segment identifiers, such as indices of memory units of the segment mapper 164, may be transmitted to another device (e.g., a mobile device, a game console, a voice assistant, etc.) to generate the output media stream. Additionally, or alternatively, in some examples, the headset device 2002 may receive an input media stream from another device, and the segment mapper 164 may operate to generate estimated media output segments to fill gaps in the output media stream due to missing or corrupt packets of the input media stream.

Figure 21:
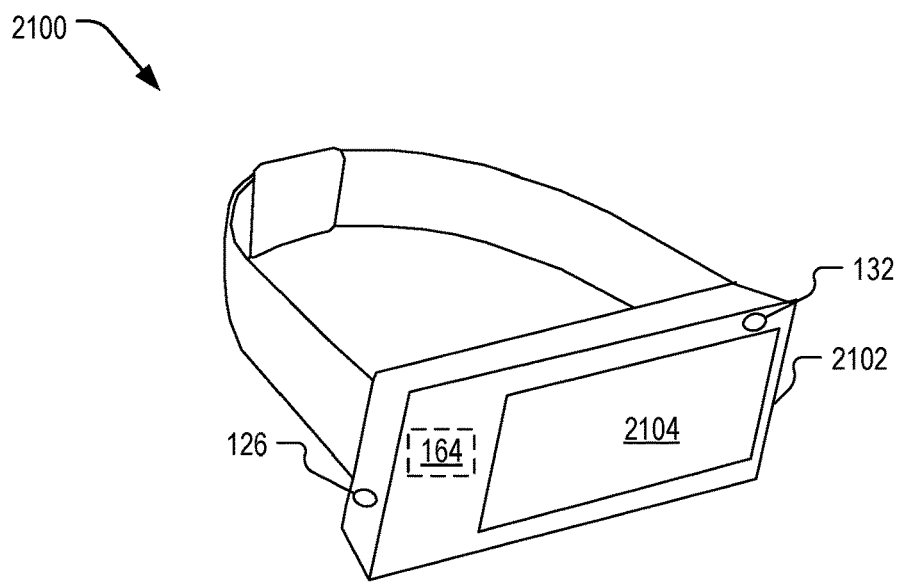
FIG. 21 is a diagram of a wearable electronic device operable to represent media segments using sets of weights, in accordance with some examples of the present disclosure.

FIG. 21 depicts an implementation 2100 in which the device 102 includes a wearable electronic device 2102, illustrated as a "smart watch." The wearable electronic device 2102 includes the processor(s) 104 and a display screen 2104. Components of the processor(s) 104, including the segment mapper 164 and optionally the media segment identification model(s) 160 and the media stream assembler 168, are integrated in the wearable electronic device 2102. In a particular example, the segment mapper 164 operates to generate media output segments corresponding to segments of an input media stream. For example, the microphone 126 may capture speech of a user of the wearable electronic device 2102 and may generate media output segments representing phonemes or other utterance segments of the speech. The media output segments may be used to generate an output media stream at the display screen 2104 of the wearable electronic device 2102, or media segment identifiers, such as indices of memory units of the segment mapper 164, may be transmitted to another device (e.g., a mobile device, a game console, a voice assistant, etc.) to generate the output media stream. Additionally, or alternatively, in some examples, the wearable electronic device 2102 may receive an input media stream from another device, and the media segment identification model(s) 160 may operate to generate estimated media segments to fill gaps in the output media stream due to missing or corrupt packets of the input media stream.

FIG. 22 is an implementation 2200 in which the device 102 includes a wireless speaker and voice activated device 2202. The wireless speaker and voice activated device 2202 can have wireless network connectivity and is configured to execute an assistant operation. The wireless speaker and voice activated device 2202 of FIG. 22 includes the processor(s) 104, which include the segment mapper 164 (and optionally the media segment identification model(s) 160 and the media stream assembler 168). Additionally, the wireless speaker and voice activated device 2202 includes the microphone 126 and the speaker 142. During operation, in response to receiving an input media stream including user speech, the segment mapper 164 operates to generate media output segments corresponding to segments of an input media stream. For example, the microphone 126 may capture speech of a user of the wireless speaker and voice activated device 2202 and may generate media output segments representing phonemes or other utterance segments of the speech. Media segment identifiers, such as indices of memory units of the segment mapper 164, may be transmitted to another device (e.g., a mobile device, a game console, a voice assistant, etc.) to generate the output media stream. In some examples, the wireless speaker and voice activated device 2202 may receive an input media stream from another device and the media segment identification model(s) 160 may operate to generate estimated media segments to fill gaps in the output media stream due to missing or corrupt packets of the input media stream.

FIG. 23 depicts an implementation 2300 in which the device 102 is integrated into or includes a portable electronic device that corresponds to the camera 132. In FIG. 23, the camera 132 includes the processor(s) 104 and the microphone 126. The processor(s) 104 include the segment mapper 164 and optionally also include the media segment identification model(s) 160 and the media stream assembler 168. During operation, the camera 132, the microphone 126, or both, generate an input media stream and the segment mapper 164 generates media output segments corresponding to segments of the input media stream. For example, the microphone 126 may capture speech of a user of the camera 132, and media segment identifiers representing phonemes or other utterance segments of the speech may be generated. Media segment identifiers, such as indices of memory units of the segment mapper 164, may be transmitted to another device (e.g., a mobile device, a game console, a voice assistant, etc.) to generate the output media stream.

FIG. 24 depicts an implementation 2400 in which the device 102 includes a portable electronic device that corresponds to an extended reality headset 2402 (e.g., a virtual reality headset, a mixed reality headset, or an augmented reality headset, or a combination thereof). The extended reality headset 2402 includes the microphone 126 and the processor(s) 104. In a particular aspect, a visual interface device is positioned in front of the user's eyes to enable display of augmented reality, mixed reality, or virtual reality images or scenes to the user while the extended reality headset 2402 is worn. In a particular example, the visual interface device is configured to display a notification indicating user speech detected in the audio signal from the microphone 126. In a particular implementation, the processor(s) 104 include the segment mapper 164 and optionally also include the media segment identification model(s) 160 and the media stream assembler 168. During operation, the microphone 126 may generate an input media stream, and the segment mapper 164 may generate media output segments corresponding to segments of the input media stream. For example, the microphone 126 may capture speech of a user of the extended reality headset 2402, and the segment mapper 164 may generate media output segments representing phonemes or other utterance segments of the speech. Media segment identifiers, such as indices of memory units of the segment mapper 164, may be transmitted to another device (e.g., a mobile device, a game console, a voice assistant, etc.) to generate the output media stream.

FIG. 25 depicts an implementation 2500 in which the device 102 corresponds to, or is integrated within, a vehicle 2502, illustrated as a manned or unmanned aerial device (e.g., a package delivery drone). The microphone 126 and the processor(s) 104 are integrated into the vehicle 2502. In a particular implementation, the processor(s) 104 include the segment mapper 164 and optionally also include the media segment identification model(s) 160 and the media stream assembler 168. During operation, the microphone 126 may generate an input media stream, and the segment mapper 164 generates media output segments corresponding to segments of an input media stream. For example, the microphone 126 may capture speech of a person near the vehicle 2502 (such as speech including delivery instructions from an authorized user of the vehicle 2502) and the segment mapper 164 may generate media output segments representing phonemes or other utterance segments of the speech. Media segment identifiers, such as indices of memory units of the segment mapper 164, may be transmitted to another device (e.g., a server device, etc.) to generate the output media stream or to store the media segment identifiers (e.g., as evidence of the delivery instructions).

FIG. 26 depicts another implementation 2600 in which the device 102 corresponds to, or is integrated within, a vehicle 2602, illustrated as a car. The vehicle 2602 includes the processor(s) 104, which include the segment mapper 164 and optionally include the media segment identification model(s) 160 and the media stream assembler 168. The vehicle 2602 also includes the microphone 126, the speaker 142, and the display device 146. The microphone 126 is positioned to capture utterances of an operator of the vehicle 2602 or a passenger of the vehicle 2602. During operation, the microphone 126 may generate an input media stream, and the segment mapper 164 generates media output segments corresponding to segments of an input media stream. For example, the microphone 126 may capture speech of the operator of the vehicle 2602 and the segment mapper 164 may generate media output segments representing phonemes or other utterance segments of the speech. Media segment identifiers, such as indices of memory units of the segment mapper 164, may be transmitted to another device (e.g., another vehicle, a mobile phone, etc.) to generate the output media stream. Additionally, or alternatively, in some examples, the vehicle 2602 may receive an input media stream from another device, and the segment mapper 164 may operate to generate estimated media segments to fill gaps in the output media stream due to missing or corrupt packets of the input media stream.

Figure 27:
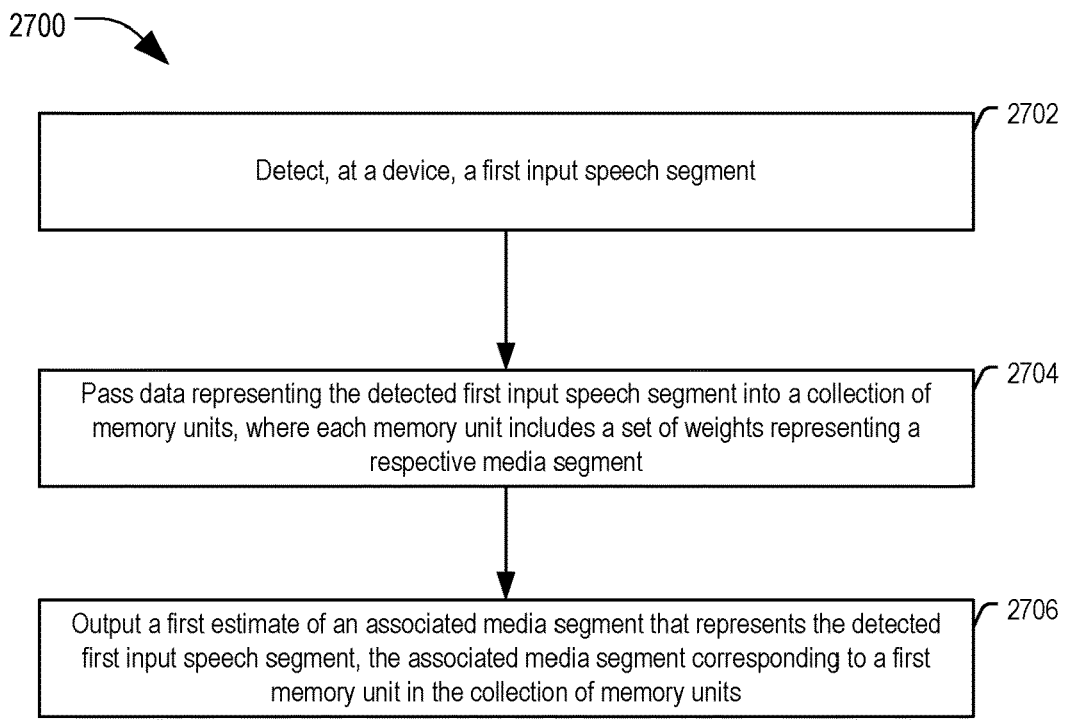
FIG. 27 is a diagram of a particular implementation of a method of generating a media segment based on sets of weights that may be performed by a device of FIG. 1, in accordance with some examples of the present disclosure.

Referring to FIG. 27, a particular implementation of a method 2700 of generating a media output segment represented by a set of weights is shown. In a particular aspect, one or more operations of the method 2700 are performed by at least one of the segment mapper 164, the segment mapper 172, the processor(s) 104, the device 102, the device 152, the system 100 of FIG. 1, or a combination thereof.

The method 2700 includes, at block 2702, detecting, at a device, a first input speech segment. For example, the device 102 detects the input media segment 158 received as part of the input media stream 120. In some implementations, the detected first input speech segment is received over a communication channel. For example, the first input speech segment can be received at the device 102 via the communication channel 124 as part of the input media stream 120. In another example, the detected first input speech segment is received at the device 102 via the microphone 126.

The method 2700 includes, at block 2704, passing data representing the detected first input speech segment into a collection of memory units, where each memory unit includes a set of weights representing a respective media segment. As an example, the media output segment identifier 162 is passed to the segment mapper 164 for selection of a particular memory unit from collection of memory units 116. In some implementations, the weights represent one or more media parameters, such as a set of the weights 118 that represents the media parameters 240, the media parameters 1104, or a combination thereof.

The method 2700 includes, at block 2706, outputting a first estimate of an associated media segment that represents the detected first input speech segment, the associated media segment corresponding to a first memory unit in the collection of memory units. In some implementations, the first estimate is part of a reconstructed media representation of the detected first input speech segment, such as a media output segment 166 that is included in the output media stream 140. In an example, the segment mapper 164 of the device 102 can output the media output segment 166 to the media stream assembler 168, and the device 102 can output the media output segment 166 to the speaker 142 as part the output media stream 140. In an example, the first estimate includes one or more media parameters, such as one or more of the media parameters 240.

In some implementations, the method 2700 includes sending the first estimate over a communication channel to another device. For example, the device 102 can send the media output segment identifier 162 as an estimate of the input media segment 158 to the device 152 via the communication channel 150.

In some implementations, the method 2700 includes detecting a second input speech segment, passing second data representing the detected second input speech segment into the collection of memory units, and outputting a second estimate of a second associated speech segment that represents the detected second input speech segment, the second associated speech segment corresponding to a second memory unit in the collection of memory units. In an example, the first estimate can correspond to a best match for the detected first input speech segment, such as the media output segment 710 in the first time step illustrated in FIG. 7, and the second estimate does not correspond to a best match for the detected second input speech segment, such as the media output segment 722 that is selected during the second time step to reduce discontinuity in pitch between the first time step and the second time step. The first estimate may be part of a reconstructed speech representation of the detected first input speech segment and the detected second input speech segment, such as included as part of an output media stream that includes the media output segment 710 and the media output segment 722.

The method 2700 of FIG. 27 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 2700 of FIG. 27 may be performed by a processor that executes instructions, such as described with reference to FIG. 29.

Figure 28:
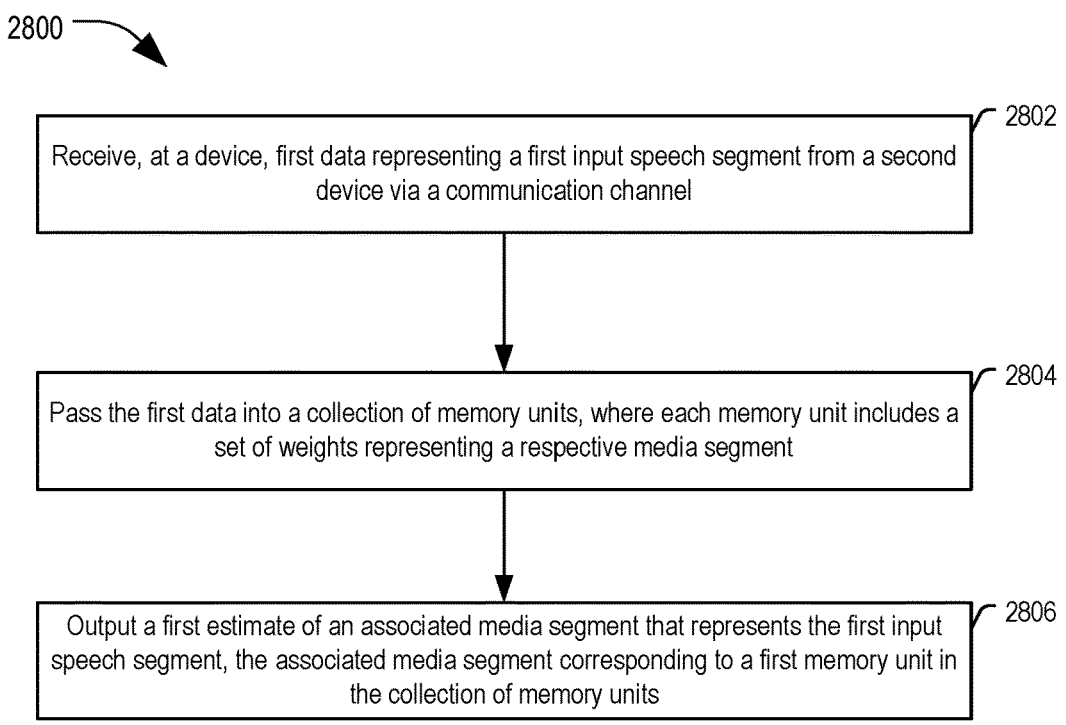
FIG. 28 is a diagram of another particular implementation of a method of generating a media segment based on sets of weights that may be performed by a device of FIG. 1, in accordance with some examples of the present disclosure.

Referring to FIG. 28, a particular implementation of a method 2800 of generating a media output segment represented by a set of weights is shown. In a particular aspect, one or more operations of the method 2800 are performed by at least one of the segment mapper 164, the segment mapper 172, the processor(s) 104, the device 102, the device 152, the system 100 of FIG. 1, or a combination thereof.

The method 2800 includes, at block 2802, receiving, at a device, first data representing a first input speech segment from a second device via a communication channel. For example, the device 152 can receive the media output segment identifier 162 from the device 102 via the communication channel 150.

The method 2800 includes, at block 2804, passing the first data into a collection of memory units, where each memory unit includes a set of weights representing a respective media segment. For example, the device 152 can pass the media output segment identifier 162 to the segment mapper 172, which can include duplicates of the memory units 116 and the corresponding sets of weights 118 that are in the segment mapper 164 of the device 102.

The method 2800 includes, at block 2806, outputting a first estimate of an associated media segment that represents the detected first input speech segment, the associated media segment corresponding to a first memory unit in the collection of memory units. In some implementations, the first estimate is part of a reconstructed media representation of the detected first input speech segment, such as a media output segment that is included in the output media stream 180. In an example, the segment mapper 172 of the device 152 can output the media output segment to the media stream assembler 174, and the device 152 can output the media output segment as part the output media stream 180. In an example, the first estimate includes one or more media parameters, such as one or more of the media parameters 240 that are included in the weights of the segment mapper 172.

The method 2800 of FIG. 28 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 2800 of FIG. 28 may be performed by a processor that executes instructions, such as described with reference to FIG. 29.

Figure 29:
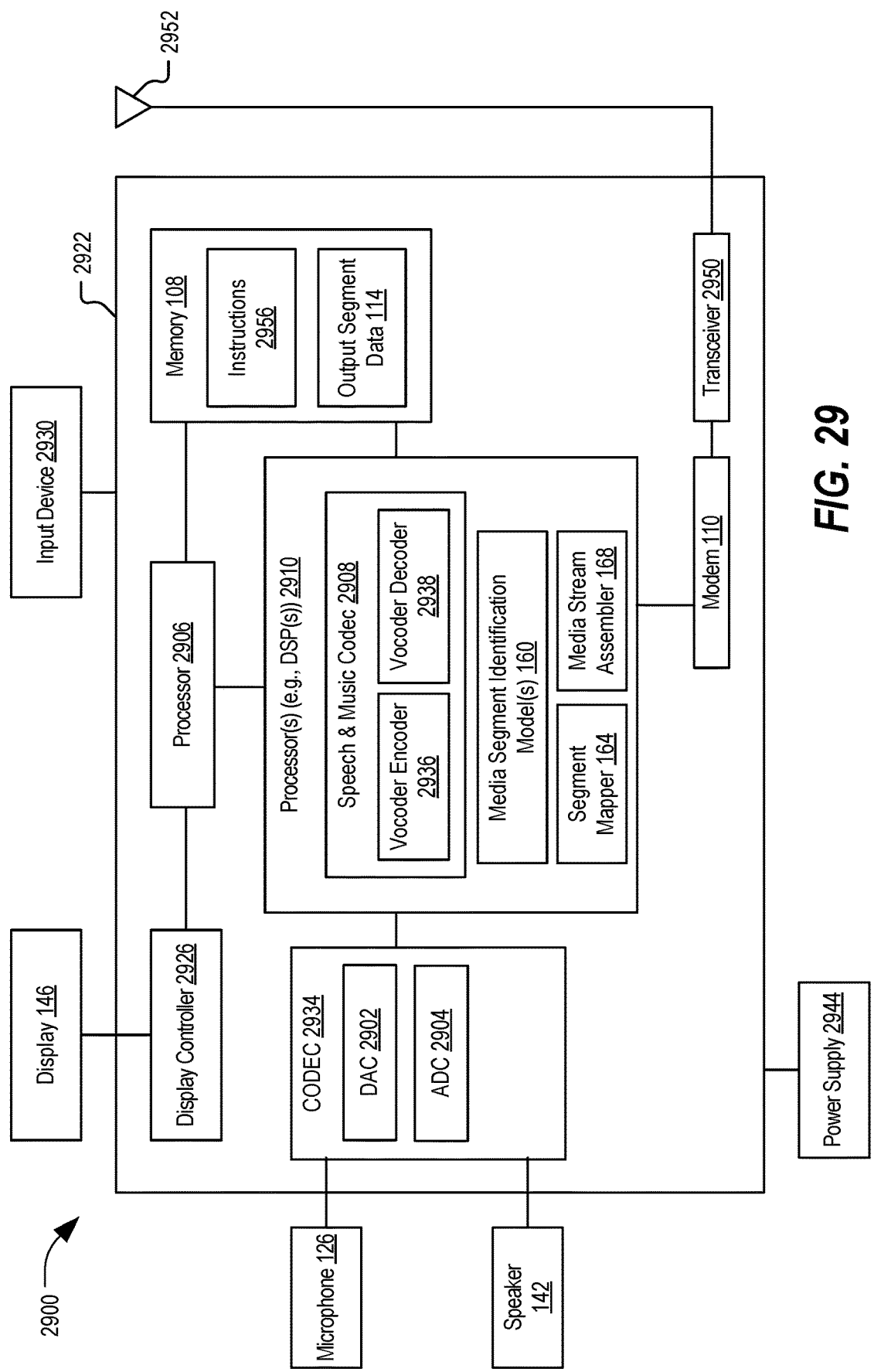
FIG. 29 is a block diagram of a particular illustrative example of a device that is operable to represent media segments using sets of weights, in accordance with some examples of the present disclosure.

Referring to FIG. 29, a block diagram of a particular illustrative implementation of a device is depicted and generally designated 2900. In various implementations, the device 2900 may have more or fewer components than illustrated in FIG. 29. In an illustrative implementation, the device 2900 may correspond to the device 102 or the device 152. In an illustrative implementation, the device 2900 may perform one or more operations described with reference to FIGS. 1-28.

In a particular implementation, the device 2900 includes a processor 2906 (e.g., a central processing unit (CPU)). The device 2900 may include one or more additional processors 2910 (e.g., one or more DSPs). In a particular aspect, the processor(s) 104 of FIG. 1 correspond to the processor 2906, the processors 2910, or a combination thereof. The processors 2910 may include a speech and music coder-decoder (CODEC) 2908 that includes a voice coder ("vocoder") encoder 2936, a vocoder decoder 2938, the media segment identification model(s) 160, the segment mapper 164, the media stream assembler 168, or a combination thereof.

The device 2900 may include the memory 108 and a CODEC 2934. The memory 108 may include instructions 2956 that are executable by the one or more additional processors 2910 (or the processor 2906) to implement the functionality described with reference to the media segment identification model(s) 160, the segment mapper 164, the media stream assembler 168, or a combination thereof. In the example illustrated in FIG. 29, the memory 108 also includes the output segment data 114.

In FIG. 29, the device 2900 includes the modem 110 coupled, via a transceiver 2950, to an antenna 2952. The modem 110, the transceiver 2950, and the antenna 2952 may be operable to receive an input media stream, to transmit an output media stream, to receive one or more media segment identifiers, to transmit one or more media segment identifiers, or a combination thereof.

The device 2900 may include the display device 146 coupled to a display controller 2926. The speaker 142 and the microphone 126 may be coupled to the CODEC 2934. The CODEC 2934 may include a digital-to-analog converter (DAC) 2902, an analog-to-digital converter (ADC) 2904, or both. In a particular implementation, the CODEC 2934 may receive analog signals from the microphone 126, convert the analog signals to digital signals using the analog-to-digital converter 2904, and provide the digital signals to the speech and music codec 2908. The speech and music codec 2908 may process the digital signals, and the digital signals may further be processed by the media segment identification model(s) 160, the segment mapper 164, the media stream assembler 168, or a combination thereof. In a particular implementation, the speech and music codec 2908 may provide digital signals to the CODEC 2934. The CODEC 2934 may convert the digital signals to analog signals using the digital-to-analog converter 2902 and may provide the analog signals to the speaker 142.

In a particular implementation, the device 2900 may be included in a system-in-package or system-on-chip device 2922. In a particular implementation, the memory 108, the processor 2906, the processors 2910, the display controller 2926, the CODEC 2934, and the modem 110 are included in the system-in-package or system-on-chip device 2922. In a particular implementation, an input device 2930 and a power supply 2944 are coupled to the system-in-package or the system-on-chip device 2922. Moreover, in a particular implementation, as illustrated in FIG. 29, the display device 146, the input device 2930, the speaker 142, the microphone 126, the antenna 2952, and the power supply 2944 are external to the system-in-package or the system-on-chip device 2922. In a particular implementation, each of the display device 146, the input device 2930, the speaker 142, the microphone 126, the antenna 2952, and the power supply 2944 may be coupled to a component of the system-in-package or the system-on-chip device 2922, such as an interface (e.g., the input interface 106 or the output interface 112) or a controller.

The device 2900 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a mixed reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus means for detecting a first input speech segment. For example, the means for detecting a first input speech segment can correspond to the microphone 126, the camera 132, the communication channel 124, the input interface 106, the processor(s) 104, the media segment identification model(s) 160, the processor 2306, the processor(s) 2910, the codec 2934, one or more other circuits or components configured to detect an input speech segment, or any combination thereof.

In conjunction with the described implementations, the apparatus also means for passing data representing the detected first input speech segment into a collection of memory units, where each memory unit includes a set of weights representing a respective media segment. For example, the means for passing data representing the detected first input speech segment into a collection of memory units can correspond to the processor(s) 104, the media segment identification model(s) 160, the processor 2906, the processor(s) 2910, one or more other circuits or components configured to passing data representing the detected first input speech segment into a collection of memory units, or any combination thereof.

In conjunction with the described implementations, the apparatus also includes means for outputting a first estimate of an associated media segment that represents the detected first input speech segment, the associated media segment corresponding to a first memory unit in the collection of memory units. For example, the means for outputting a first estimate of an associated media segment that represents the detected first input speech segment can correspond to the segment mapper 164, one or more of the memory units 116, the media stream assembler 168, the processor 2906, the processor(s) 2910, one or more other circuits or components configured to outputting a first estimate of an associated media segment, or any combination thereof.

In some implementations, a non-transitory computer-readable medium (e.g., a computer-readable storage device, such as the memory 108) includes instructions (e.g., the instructions 2956) that, when executed by one or more processors (e.g., the one or more processors 104, the one or more processors 2310 or the processor 2906), cause the one or more processors to detect a first input speech segment (e.g., the input media segment 158); pass data (e.g., the media output segment identifier 162) representing the detected first input speech segment into a collection of memory units (e.g., the memory units 116), where each memory unit includes a set of weights (e.g., $W_1$) representing a respective media segment; and output a first estimate (e.g., the media output segment 166) of an associated media segment that represents the detected first input speech segment, the associated media segment corresponding to a first memory unit (e.g., the memory unit 190) in the collection of memory units.

Particular aspects of the disclosure are described below in a first set of interrelated Examples:

According to Example 1, a device includes: a memory configured to store a collection of sets of weights, each of the sets of weights representing a respective media segment; one or more processors configured to: detect a first input speech segment; generate data representing the detected first input speech segment; pass the data representing the detected first input speech segment into a collection of memory units, each memory unit of the collection of memory units including a set of weights from the collection of sets of weights; and generate a first estimate of an associated media segment that represents the detected first input speech segment, the associated media segment corresponding to a first memory unit in the collection of memory units.

Example 2 includes the device of Example 1, wherein the first estimate is part of a reconstructed media representation of the detected first input speech segment.

Example 3 includes the device of Example 1 or Example 2, wherein each of the sets of weights represent one or more media parameters of the respective media segment associated with that set of weights.

Example 4 includes the device of Example 3, wherein the one or more media parameters include at least one of: speech parameters including pulse code modulated (PCM) sample values associated with a respective memory unit, compressed representations of the PCM sample values associated with the respective memory unit, or acoustic features associated with the respective memory unit.

Example 5 includes the device of Example 3 or Example 4, wherein the one or more media parameters include pulse code modulated (PCM) sample values associated with a respective memory unit.

Example 6 includes the device of any of Example 3 to Example 5, wherein the one or more media parameters include compressed representations of the PCM sample values associated with a respective memory unit.

Example 7 includes the device of any of Example 3 to Example 6, wherein the one or more media parameters include acoustic features associated with a respective memory unit.

Example 8 includes the device of any of Example 3 to Example 7, wherein the one or more media parameters include at least one of: pixel values of a video frame associated with a respective memory unit, visual landmarks of the video frame associated with the respective memory unit, a head pose vector; or a body skeleton vector.

Example 9 includes the device of any of Example 3 to Example 8, wherein the one or more media parameters include pixel values of a video frame associated with a respective memory unit.

Example 10 includes the device of any of Example 3 to Example 9, wherein the one or more media parameters include visual landmarks of a video frame associated with a respective memory unit.

Example 11 includes the device of any of Example 3 to Example 10, wherein the one or more media parameters include a head pose vector.

Example 12 includes the device of any of Example 3 to Example 11, wherein the one or more media parameters include a body skeleton vector.

Example 13 includes the device of any of Example 3 to Example 12, wherein the first estimate additionally includes the media parameters of the associated media segment.

Example 14 includes the device of any of Example 1 to Example 13, wherein the collection of memory units represent nodes of one or more layers of a network.

Example 15 includes the device of Example 14, wherein the network is a neural network.

Example 16 includes the device of any of Example 1 to Example 15, wherein the one or more processors are further configured to: detect a second input speech segment; pass second data representing the detected second input speech segment into the collection of memory units; and generate a second estimate of a second associated media segment that represents the detected second input speech segment, the second associated media segment corresponding to a second memory unit in the collection of memory units.

Example 17 includes the device of Example 16, wherein the one or more processors are configured to receive the detected first input speech segment and the detected second input speech segment over a communication channel, and wherein the first estimate and second estimate are part of a reconstructed speech representation of the detected first input speech segment and the detected second input speech segment.

Example 18 includes the device of Example 17, wherein the first estimate corresponds to a best match for the detected first input speech segment, and wherein the second estimate does not correspond to a best match for the detected second input speech segment.

Example 19 includes the device of any of Example 16 to Example 18, wherein the one or more processors are further configured to: generate multiple estimates of associated media segments that represent the detected second input speech segment; and select the second estimate from among the multiple estimates based on the first estimate.

Example 20 includes the device of any of Example 1 to Example 19, wherein the one or more processors are configured to process the detected first input speech segment using a first stage neural network to generate the data representing the detected first input speech segment.

Example 21 includes the device of Example 20, wherein the one or more processors are configured to, as part of a training operation: perform a comparison of the first estimate to a target estimate for the detected first input speech segment; and update the first stage neural network based on the comparison.

Example 22 includes the device of Example 20 or Example 21, wherein the one or more processors are configured to, as part of a training operation: determine target media parameters based on features of the detected first input speech segment; perform a comparison of the target media parameters with media parameters of the media segment that is associated with the first estimate; and update the first stage neural network based on the comparison.

Example 23 includes the device of Example 20 or Example 21, wherein the one or more processors are configured to, as part of a training operation: determine a target media segment based on a target estimate for the detected first input speech segment; determine target media parameters of the target media segment; perform a comparison of the target media parameters with media parameters of the media segment that is associated with the first estimate; and update the first stage neural network based on the comparison.

Example 24 includes the device of any of Example 1 to Example 23, further including a modem configured to send the first estimate to a second device via a communication channel.

Example 25 includes the device of any of Example 1 to Example 24, further including one or more microphones configured to generate audio data that includes the detected first input speech segment.

Example 26 includes the device of any of Example 1 to Example 25, further including one or more speakers configured to play out audio data corresponding to the associated media segment.

According to Example 27, a method includes: detecting, at a device, a first input speech segment; passing data representing the detected first input speech segment into a collection of memory units, where each memory unit includes a set of weights representing a respective media segment; and outputting a first estimate of an associated media segment that represents the detected first input speech segment, the associated media segment corresponding to a first memory unit in the collection of memory units.

Example 28 includes the method of Example 27, further including sending the first estimate over a communication channel to another device.

Example 29 includes the method of Example 28, wherein the first estimate is part of a reconstructed media representation of the detected first input speech segment.

Example 30 includes the method of any of Example 27 to Example 29, wherein the weights represent one or more media parameters.

Example 31 includes the method of Example 30, wherein the first estimate includes the one or more media parameters.

Example 32 includes the method of Example 27, wherein the detected first input speech segment is received over a communication channel.

Example 33 includes the method of any of Example 27 to Example 32, further including: detecting a second input speech segment; passing second data representing the detected second input speech segment into the collection of memory units; and outputting a second estimate of a second associated speech segment that represents the detected second input speech segment, the second associated speech segment corresponding to a second memory unit in the collection of memory units.

Example 34 includes the method of Example 33, wherein the first estimate corresponds to a best match for the detected first input speech segment and wherein the second estimate does not correspond to a best match for the detected second input speech segment.

Example 35 includes the method of Example 33 or Example 34, wherein the first estimate is part of a reconstructed speech representation of the detected first input speech segment and the detected second input speech segment.

According to Example 36, a device includes: a memory configured to store instructions; and one or more processors configured to perform the method of any of Example 27 to Example 35.

According to Example 37, a non-transitory computer-readable medium includes instructions that, when executed by one or more processors, cause the one or more processors to perform the method of any of Example 27 to Example 35.

According to Example 38, an apparatus includes means for carrying out the method of any of Example 27 to Example 35.

According to Example 39, a non-transitory computer-readable medium includes instructions that, when executed by one or more processors, cause the one or more processors to: detect a first input speech segment; pass data representing the detected first input speech segment into a collection of memory units, where each memory unit includes a set of weights representing a respective media segment; and output a first estimate of an associated media segment that represents the detected first input speech segment, the associated media segment corresponding to a first memory unit in the collection of memory units.

According to Example 40, an apparatus includes: means for detecting a first input speech segment; means for passing data representing the detected first input speech segment into a collection of memory units, where each memory unit includes a set of weights representing a respective media segment; and means for outputting a first estimate of an associated media segment that represents the detected first input speech segment, the associated media segment corresponding to a first memory unit in the collection of memory units.

Particular aspects of the disclosure are described below in a second set of interrelated Examples:

According to Example 1, a device includes: a memory configured to store a collection of sets of weights, each of the sets of weights representing a respective media segment; one or more processors configured to: receive, from a second device via a communication channel, first data representing a first input speech segment; pass the first data into a collection of memory units, each memory unit of the collection of memory units including a set of weights from the collection of sets of weights; and generate a first estimate of an associated media segment that represents the first input speech segment, the associated media segment corresponding to a first memory unit in the collection of memory units.

Example 2 includes the device of Example 1, wherein the first estimate is part of a reconstructed media representation of the first input speech segment.

Example 3 includes the device of Example 1 or Example 2, wherein each of the sets of weights represent one or more media parameters of the respective media segment associated with that set of weights.

Example 4 includes the device of Example 3, wherein the one or more media parameters include at least one of: speech parameters including pulse code modulated (PCM) sample values associated with a respective memory unit, compressed representations of the PCM sample values associated with the respective memory unit, or acoustic features associated with the respective memory unit.

Example 5 includes the device of Example 3 or Example 4, wherein the one or more media parameters include pulse code modulated (PCM) sample values associated with a respective memory unit.

Example 6 includes the device of any of Example 3 to Example 5, wherein the one or more media parameters include compressed representations of the PCM sample values associated with a respective memory unit.

Example 7 includes the device of any of Example 3 to Example 6, wherein the one or more media parameters include acoustic features associated with a respective memory unit.

Example 8 includes the device of any of Example 3 to Example 7, wherein the one or more media parameters include at least one of: pixel values of a video frame associated with a respective memory unit, visual landmarks of the video frame associated with the respective memory unit, a head pose vector; or a body skeleton vector.

Example 9 includes the device of any of Example 3 to Example 8, wherein the one or more media parameters include pixel values of a video frame associated with a respective memory unit.

Example 10 includes the device of any of Example 3 to Example 9, wherein the one or more media parameters include visual landmarks of a video frame associated with a respective memory unit.

Example 11 includes the device of any of Example 3 to Example 10, wherein the one or more media parameters include a head pose vector.

Example 12 includes the device of any of Example 3 to Example 11, wherein the one or more media parameters include a body skeleton vector.

Example 13 includes the device of any of Example 3 to Example 12, wherein the first estimate additionally includes the media parameters of the associated media segment.

Example 14 includes the device of any of Example 1 to Example 13, wherein the collection of memory units represent nodes of one or more layers of a network.

Example 15 includes the device of Example 14, wherein the network is a neural network.

Example 16 includes the device of any of Example 1 to Example 15, wherein the one or more processors are further configured to: receive, from the second device via the communication channel, second data representing a second input speech segment; pass the second data into the collection of memory units; and generate a second estimate of a second associated media segment that represents the second input speech segment, the second associated media segment corresponding to a second memory unit in the collection of memory units.

Example 17 includes the device of Example 16, wherein the first estimate and second estimate are part of a reconstructed speech representation of the first input speech segment and the second input speech segment.

Example 18 includes the device of Example 17, wherein the first estimate corresponds to a best match for the first input speech segment, and wherein the second estimate does not correspond to a best match for the second input speech segment.

Example 19 includes the device of any of Example 16 to Example 18, wherein the one or more processors are further configured to: generate multiple estimates of associated media segments that represent the second input speech segment; and select the second estimate from among the multiple estimates based on the first estimate.

Example 20 includes the device of any of Example 1 to Example 19, further including a modem configured to receive the first data via the communication channel.

Example 21 includes the device of any of Example 1 to Example 20, further including one or more speakers configured to play out audio data corresponding to the associated media segment.

According to Example 22, a method includes: receiving, at a device, first data representing a first input speech segment from a second device via a communication channel; passing the first data into a collection of memory units, where each memory unit includes a set of weights representing a respective media segment; and outputting a first estimate of an associated media segment that represents the detected first input speech segment, the associated media segment corresponding to a first memory unit in the collection of memory units.

Example 23 includes the method of Example 22, wherein the first estimate is part of a reconstructed media representation of the detected first input speech segment.

Example 24 includes the method of Example 22 or Example 23, wherein the weights represent one or more media parameters.

Example 25 includes the method of Example 24, wherein the first estimate includes the one or more media parameters.

Example 26 includes the method of any of Example 22 to Example 25, further including: receiving second data representing a second input speech segment; passing the second data into the collection of memory units;

and outputting a second estimate of a second associated speech segment that represents the second input speech segment, the second associated speech segment corresponding to a second memory unit in the collection of memory units.

Example 27 includes the method of Example 26, wherein the first estimate corresponds to a best match for the first input speech segment and wherein the second estimate does not correspond to a best match for the second input speech segment.

Example 28 includes the method of Example 26 or Example 27, wherein the first estimate is part of a reconstructed speech representation of the first input speech segment and the second input speech segment.

According to Example 29, a device includes: a memory configured to store instructions; and one or more processors configured to perform the method of any of Example 22 to Example 28.

According to Example 30, a non-transitory computer-readable medium includes instructions that, when executed by one or more processors, cause the one or more processors to perform the method of any of Example 22 to Example 28.

According to Example 31, an apparatus includes means for carrying out the method of any of Example 22 to Example 28.

According to Example 32, a non-transitory computer-readable medium includes instructions that, when executed by one or more processors, cause the one or more processors to: receive, at a device, first data representing a first input speech segment from a second device via a communication channel; pass the first data into a collection of memory units, where each memory unit includes a set of weights representing a respective media segment; and output a first estimate of an associated media segment that represents the detected first input speech segment, the associated media segment corresponding to a first memory unit in the collection of memory units.

According to Example 33, an apparatus includes: means for receiving, via communication channel, first data representing a first input speech segment; means for passing the first data into a collection of memory units, where each memory unit includes a set of weights representing a respective media segment; and means for outputting a first estimate of an associated media segment that represents the detected first input speech segment, the associated media segment corresponding to a first memory unit in the collection of memory units.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
a memory configured to store a collection of sets of weights, each of the sets of weights representing a respective media segment;
one or more processors configured to:
detect a first input speech segment;
generate data representing the detected first input speech segment;
pass the data representing the detected first input speech segment into a collection of memory units, each memory unit of the collection of memory units including a set of weights from the collection of sets of weights, wherein each of the sets of weights represent one or more media parameters of the respective media segment associated with that set of weights, and wherein the one or more media parameters include at least one of: speech parameters including pulse code modulated (PCM) sample values associated with a respective memory unit, compressed representations of the PCM sample values associated with the respective memory unit, or acoustic features associated with the respective memory unit; and
generate a first estimate of an associated media segment that represents the detected first input speech segment, the associated media segment corresponding to a first memory unit in the collection of memory units.

2. The device of claim 1, wherein the first estimate is part of a reconstructed media representation of the detected first input speech segment.

3. The device of claim 1, wherein the one or more media parameters include at least one of: pixel values of a video frame associated with a respective memory unit, visual landmarks of the video frame associated with the respective memory unit, a head pose vector, or a body skeleton vector.

4. The device of claim 1, wherein the first estimate additionally includes the one or more media parameters of the associated media segment.

5. The device of claim 1, wherein the collection of memory units represent nodes of one or more layers of a network.

6. The device of claim 5, wherein the network is a neural network.

7. The device of claim 1, wherein the one or more processors are further configured to:
detect a second input speech segment;
pass second data representing the detected second input speech segment into the collection of memory units; and
generate a second estimate of a second associated media segment that represents the detected second input speech segment, the second associated media segment corresponding to a second memory unit in the collection of memory units.

8. The device of claim 7, wherein the one or more processors are configured to receive the detected first input speech segment and the detected second input speech segment over a communication channel, and wherein the first estimate and the second estimate are part of a reconstructed speech representation of the detected first input speech segment and the detected second input speech segment.

9. The device of claim 8, wherein the first estimate corresponds to a best match for the detected first input speech segment, and wherein the second estimate does not correspond to a best match for the detected second input speech segment.

10. The device of claim 7, wherein the one or more processors are further configured to:
generate multiple estimates of associated media segments that represent the detected second input speech segment; and
select the second estimate from among the multiple estimates based on the first estimate.

11. The device of claim 1, wherein the one or more processors are configured to process the detected first input speech segment using a first stage neural network to generate the data representing the detected first input speech segment.

12. The device of claim 11, wherein the one or more processors are configured to, as part of a training operation:
perform a comparison of the first estimate to a target estimate for the detected first input speech segment; and
update the first stage neural network based on the comparison.

13. The device of claim 11, wherein the one or more processors are configured to, as part of a training operation:
determine target media parameters based on features of the detected first input speech segment;
perform a comparison of the target media parameters with media parameters of the media segment that is associated with the first estimate; and
update the first stage neural network based on the comparison.

14. The device of claim 11, wherein the one or more processors are configured to, as part of a training operation:
determine a target media segment based on a target estimate for the detected first input speech segment;
determine target media parameters of the target media segment;
perform a comparison of the target media parameters with media parameters of the media segment that is associated with the first estimate; and
update the first stage neural network based on the comparison.

15. The device of claim 1, further comprising a modem configured to send the first estimate to a second device via a communication channel.

16. The device of claim 1, further comprising one or more microphones configured to generate audio data that includes the detected first input speech segment.

17. The device of claim 1, further comprising one or more speakers configured to play out audio data corresponding to the associated media segment.

18. A method comprising:
detecting, at a device, a first input speech segment;
passing data representing the detected first input speech segment into a collection of memory units, where each memory unit includes a set of weights representing one or more media parameters of a respective media segment associated with that set of weights, and wherein the one or more media parameters include at least one of: speech parameters including pulse code modulated (PCM) sample values associated with a respective memory unit, compressed representations of the PCM sample values associated with the respective memory unit, or acoustic features associated with the respective memory unit; and
outputting a first estimate of an associated media segment that represents the detected first input speech segment, the associated media segment corresponding to a first memory unit in the collection of memory units.

19. The method of claim 18, further comprising sending the first estimate over a communication channel to another device.

20. The method of claim 19, wherein the first estimate is part of a reconstructed media representation of the detected first input speech segment.

21. The method of claim 18, wherein the one or more media parameters include at least one of: pixel values of a video frame associated with a respective memory unit, visual landmarks of the video frame associated with the respective memory unit, a head pose vector, or a body skeleton vector.

22. The method of claim 21, wherein the first estimate includes the one or more media parameters.

23. The method of claim 18, wherein the detected first input speech segment is received over a communication channel.

24. The method of claim 18, further comprising:
detecting a second input speech segment;
passing second data representing the detected second input speech segment into the collection of memory units; and
outputting a second estimate of a second associated speech segment that represents the detected second input speech segment, the second associated speech segment corresponding to a second memory unit in the collection of memory units.

25. The method of claim 24, wherein the first estimate corresponds to a best match for the detected first input speech segment and wherein the second estimate does not correspond to a best match for the detected second input speech segment.

26. The method of claim 24, wherein the first estimate is part of a reconstructed speech representation of the detected first input speech segment and the detected second input speech segment.

27. A non-transitory computer-readable medium comprising instructions that, when executed by one or more processors, cause the one or more processors to:

detect a first input speech segment;

pass data representing the detected first input speech segment into a collection of memory units, where each memory unit includes a set of weights representing one or more media parameters of a respective media segment associated with that set of weights, and wherein the one or more media parameters include at least one of: speech parameters including pulse code modulated (PCM) sample values associated with a respective memory unit, compressed representations of the PCM sample values associated with the respective memory unit, or acoustic features associated with the respective memory unit; and output a first estimate of an associated media segment that represents the detected first input speech segment, the associated media segment corresponding to a first memory unit in the collection of memory units.

28. An apparatus comprising:

means for detecting a first input speech segment;

means for passing data representing the detected first input speech segment into a collection of memory units, where each memory unit includes a set of weights representing one or more media parameters of a respective media segment associated with that set of weights, and wherein the one or more media parameters include at least one of: speech parameters including pulse code modulated (PCM) sample values associated with a respective memory unit, compressed representations of the PCM sample values associated with the respective memory unit, or acoustic features associated with the respective memory unit; and means for outputting a first estimate of an associated media segment that represents the detected first input speech segment, the associated media segment corresponding to a first memory unit in the collection of memory units.

* * * * *

UNITED STATES PATENT AND TRADEMARK OFFICE
CERTIFICATE OF CORRECTION

PATENT NO. : 12,300,233 B2
APPLICATION NO. : 18/047562
DATED : May 13, 2025
INVENTOR(S) : Stephane Villette, Sen Li and Daniel Jared Sinder It is certified that error appears in the above-identified patent and that said Letters Patent is hereby corrected as shown below:

In the Specification

Column 10, Line 17, change:
"a likelihood of 0.1"
To read:
--a likelihood value of 0.1--

Column 13, Line 59, change:
"the segment mapper 172"
To read:
--the segment mapper 164--

Column 21, Line 41, change:
"segment 720"
To read:
--segment 730--

Column 24, Line 57, change:
"FIG. 6,"
To read:
--FIG. 13,--

Column 24, Line 66, change:
"FIG. 6,"
To read:
--FIG. 13,--

Signed and Sealed this
Nineteenth Day of August, 2025

Coke Morgan Stewart
*Acting Director of the United States Patent and Trademark Office*

Column 28, Line 26, change:
"speech with noise 1602"
To read:
--speech plus first noise 1602--

Column 28, Lines 33 and 34, change:
"speech with the first noise 1602"
To read:
--speech plus the first noise 1602--

Column 29, Line 56, change:
"FIG. 12,"
To read:
--FIG. 17,--

Column 36, Line 57, change:
"apparatus means"
To read:
--apparatus includes means--

Column 36, Line 67, change:
"apparatus also means"
To read:
--apparatus also includes means--

Column 38, Line 43, change:
"the media parameters"
To read:
--the one or more media parameters--

Column 42, Line 3, change:
"the media parameters"
To read:
--the one or more media parameters--